(12) United States Patent
Kim et al.

(10) Patent No.: US 8,213,914 B2
(45) Date of Patent: Jul. 3, 2012

(54) MOBILE TERMINAL CAPABLE OF PROVIDING WEB BROWSING FUNCTION AND METHOD OF CONTROLLING THE MOBILE TERMINAL

(75) Inventors: Jong Hwan Kim, Seoul (KR); Kang Sic Ham, Seoul (KR)

(73) Assignee: LG Electronics Inc., Seoul (KR)

( * ) Notice: Subject to any disclaimer, the term of this patent is extended or adjusted under 35 U.S.C. 154(b) by 388 days.

(21) Appl. No.: 12/534,644

(22) Filed: Aug. 3, 2009

(65) Prior Publication Data

US 2010/0029255 A1     Feb. 4, 2010

(30) Foreign Application Priority Data

Aug. 4, 2008   (KR) ................ 10-2008-0076047
Aug. 18, 2008   (KR) ................ 10-2008-0080500

(51) Int. Cl.
    *H04M 3/42*     (2006.01)
(52) U.S. Cl. .......... 455/414.2; 455/456.2; 345/156; 340/407.2
(58) Field of Classification Search .......... 455/566, 455/414.1–414.4, 456.1–456.6, 466; 340/407.2; 345/156–158
See application file for complete search history.

(56) References Cited

U.S. PATENT DOCUMENTS

| | | | |
|---|---|---|---|
| 7,996,045 B1* | 8/2011 | Bauer et al. ................. | 455/566 |
| 2009/0064047 A1* | 3/2009 | Shim et al. .................. | 715/835 |
| 2009/0088204 A1* | 4/2009 | Culbert et al. ............ | 455/556.1 |
| 2009/0158222 A1* | 6/2009 | Kerr et al. .................. | 715/867 |
| 2009/0167508 A1* | 7/2009 | Fadell et al. ............... | 340/407.2 |
| 2009/0167509 A1* | 7/2009 | Fadell et al. ............... | 340/407.2 |
| 2009/0170532 A1* | 7/2009 | Lee et al. .................. | 455/456.3 |
| 2009/0178006 A1* | 7/2009 | Lemay et al. ............... | 715/835 |
| 2009/0197635 A1* | 8/2009 | Kim et al. ................. | 455/550.1 |
| 2009/0244003 A1* | 10/2009 | Bonnat ..................... | 345/157 |
| 2009/0303187 A1* | 12/2009 | Pallakoff ................... | 345/169 |
| 2010/0169003 A1* | 7/2010 | Van Der Meer ............ | 701/207 |
| 2011/0050569 A1* | 3/2011 | Marvit et al. ............... | 345/158 |
| 2011/0128234 A1* | 6/2011 | Lipman et al. ............. | 345/173 |

* cited by examiner

*Primary Examiner* — Kamran Afshar
*Assistant Examiner* — Khawar Iqbal
(74) *Attorney, Agent, or Firm* — Lee, Hong, Degerman, Kang & Waimey

(57) ABSTRACT

A mobile terminal capable of providing a web-browsing function and a method of controlling the mobile terminal are provided. According to the mobile terminal and the method of controlling the mobile terminal, it is possible to display a text-input area included in a webpage in a certain part of a display region of the mobile terminal in response to the manipulation of a key or the movement of the mobile terminal. In addition, it is possible to sequentially enlarge or highlight one or more text-input areas displayed in the display region of the mobile terminal. Therefore, it is possible to quickly input text into an address window, an identifier (ID)/password input window or an address window included in a webpage without the need to scroll through the webpage.

16 Claims, 46 Drawing Sheets

(a)

(b)

(c)

(a)

(b)

(a)

(b)

(a)

(b)

(a)

(b)

(a)

(b)

(a)

(b)

(a)

(b)

(a)

(b)

MOBILE TERMINAL CAPABLE OF PROVIDING WEB BROWSING FUNCTION AND METHOD OF CONTROLLING THE MOBILE TERMINAL

CROSS-REFERENCE TO RELATED APPLICATION

This application claims the priority benefit of Korean Patent Application No. 10-2008-0076047, filed Aug. 4, 2008 and Korean Patent Application No. 10-2008-0080500, filed Aug. 18, 2008 in the Korean Intellectual Property Office, the disclosure of which is incorporated herein by reference.

BACKGROUND OF THE INVENTION

1. Field of the Invention

The present invention relates to a mobile terminal capable of providing a web browsing function and a method of controlling the mobile terminal, and more particularly, to a mobile terminal and a method of controlling the mobile terminal in which a text input area into which text can be input can be provided in a display region.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality.

However, there is a restriction in allocating sufficient space for a UI (such as a display device or a keypad) of a mobile terminal without compromising the mobility and the portability of a mobile terminal. The size of mobile terminals may be insufficient to properly perform data input and output functions even if they are equipped with full-touch screens. Therefore, it is necessary to develop ways to control the operation of a mobile terminal using a new data input/output method, instead of navigating through a complicated menu structure, and thus efficiently use various functions provided by the mobile terminal.

SUMMARY OF THE INVENTION

The present invention provides a mobile terminal and a method of controlling the mobile terminal in which a text input area (such as a search window or an identifier (ID)/password input window) into which text can be input can be provided in a display region.

The present invention also provides a mobile terminal and a method of controlling the mobile terminal in which a text input window displayed in a display region can be gradually enlarged or highlighted.

According to an aspect of the present invention, there is provided a method of controlling a mobile terminal capable of providing a web browsing function, the method including displaying a webpage in a display region; determining whether a tab/cursor move command has been input; and if the tab/cursor move command is determined to have been input, moving either the webpage including at least one text-input area into which text can be input or a web browser in which the webpage is displayed so that the at least one text-input area can be displayed in a certain part of the display region, or enlarging or highlighting the at least one text-input area.

According to another aspect of the present invention, there is provided a mobile terminal capable of providing a web browsing function, the mobile terminal including a display region; and a controller configured to display a webpage in a display region and determine whether a tab/cursor move command has been input, wherein, if the tab/cursor move command is determined to have been input, the controller moves either the webpage including at least one text-input area into which text can be input or a web browser in which the webpage is displayed so that the at least one text-input area can be displayed in a certain part of the display region, or enlarges or highlights the at least one text-input area.

According to another aspect of the present invention, there is provided a computer-readable recording medium having recorded thereon a program for executing a method of controlling a mobile terminal capable of providing a web browsing function, the method including displaying a webpage in a display region; determining whether a tab/cursor move command has been input; and if the tab/cursor move command is determined to have been input, moving either the webpage including at least one text-input area into which text can be input or a web browser in which the webpage is displayed so that the at least one text-input area can be displayed in a certain part of the display region, or enlarging or highlighting the at least one text-input area.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device.

Figure 1:
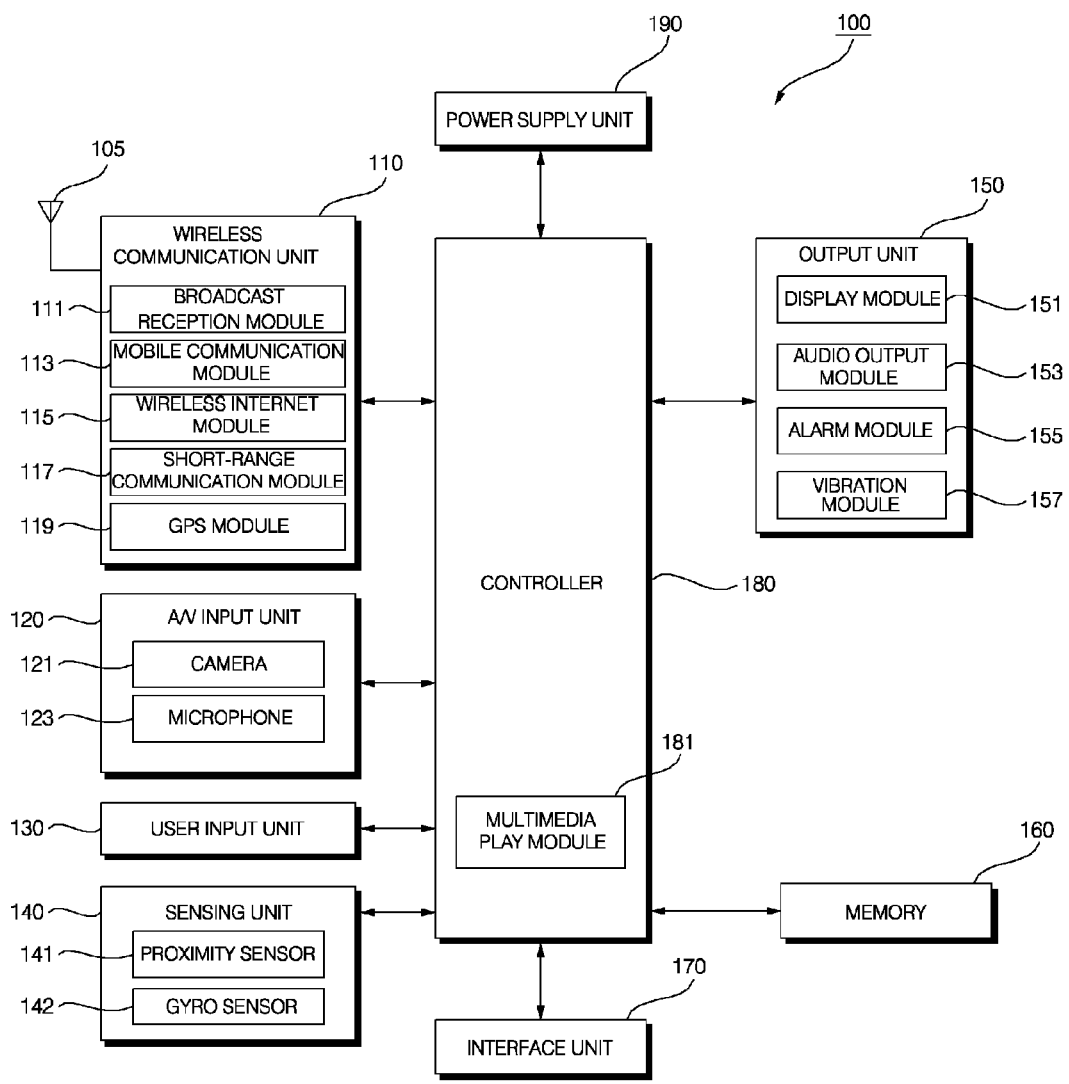
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device.

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141. The proximity sensor 141 may determine whether there is an object nearby and approaching the mobile terminal 100 without any mechanical contact with the entity. More specifically, the proximity sensor 141 may detect an object that is nearby and approaching by detecting a change in an alternating magnetic field or the rate of change of static capacitance. The sensing unit 140 may include two or more proximity sensors 141.

The sensing unit 140 may also include a gyro-sensor 142 which senses the motion of an object by using a gyroscope. Examples of the gyro-sensor 142 include an inertial sensor and an acceleration sensor. A gyroscope is classified into a mechanical gyroscope, a ring laser gyroscope, or an optic fiber gyroscope. The gyro-sensor 142 may sense the motion of the mobile terminal 100 and may thus provide a signal for controlling the mobile terminal 100.

The output unit 150 may output audio signals, video signals and alarm signals. The output unit 150 may include the display module 151, an audio output module 153, an alarm module 155, and a vibration module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. In this manner, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The vibration module 157 may generate various types of vibration effects with various intensities in response to a vibration signal provided by the controller 180. The intensity, pattern, frequency, moving direction and moving speed of a vibration effect generated by the vibration module 157 may be determined by the vibration signal. The mobile terminal 100 may include two or more vibration modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The exterior of the mobile terminal 100 will hereinafter be described in detail with reference to FIGS. 2 and 3. For convenience, assume that the mobile terminal 100 is a bar-type mobile terminal equipped with a full-touch screen. However, the present invention is not restricted to a bar-type mobile terminal. Rather, the present invention can be applied to various mobile phones, other than a bar-type mobile terminal.

Figure 2:
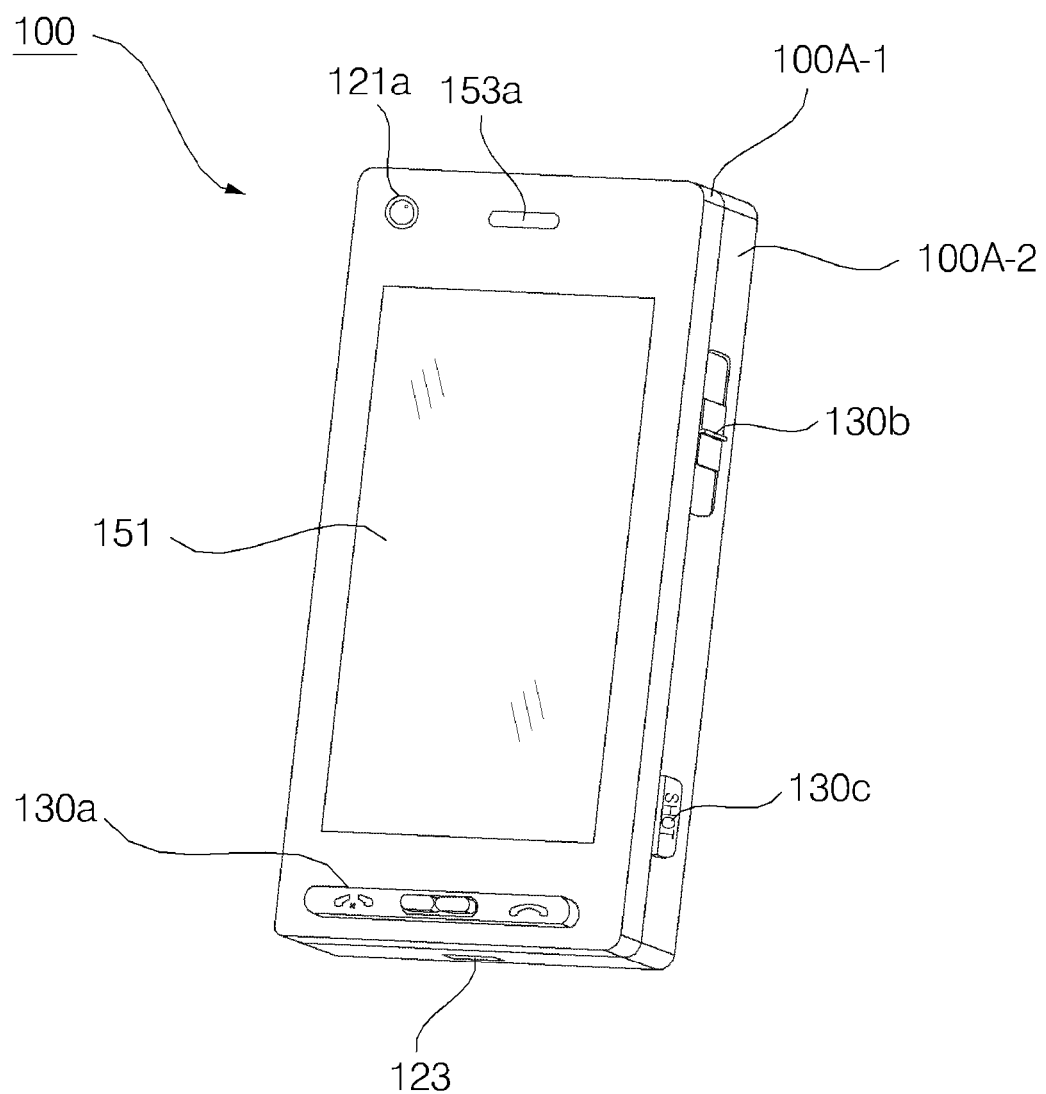
FIG. 2 illustrates a front perspective view of the mobile terminal shown in FIG. 1.

FIG. 2 illustrates a front perspective view of the mobile terminal 100 shown in FIG. 1. Referring to FIG. 2, the exterior of the first body 100A may be defined by a front case 100A-1 and a rear case 100A-2. Various electronic devices may be installed in the space formed by the front case 100A-1 and the rear case 100A-2. At least one intermediate case may be additionally provided between the front case 100A-1 and the rear case 100A-2. The front case 100A-1 and the rear case 100A-2 may be formed of a synthetic resin through injection molding. Alternatively, the front case 100A-1 and the rear case 100A-2 may be formed of a metal such as stainless steel (STS) or titanium (Ti).

The display module 151, a first audio output module 153a, a first camera 121a and a first user input unit 130a may be disposed in the front case 100A-1. A second user input unit 130b, a third user input unit 130c and the microphone 123 may be disposed on one side of the rear case 100A-2.

Examples of the display module 151 include an LCD and an OLED which can visualize information. Since a touch pad is configured to overlap the display module 151 and thus to form a layer structure, the display module 151 may serve as a touch screen. Thus, it is possible for the user to input various information to the mobile terminal 100 simply by touching the display module 151.

The first audio output module 153a may be implemented as a receiver or a speaker. The first camera 121a may be configured to capture a still image or a moving image of the user. The microphone 123 may be configured to properly receive the user's voice or other sounds.

The first through third user input units 130a through 130c may be collectively referred to as the user input unit 130. The user input unit 130 may adopt various manipulation methods as long as it can offer tactile feedback to the user.

For example, the user input unit 130 may be implemented as a dome switch or a touch pad which receives a command or information upon being pushed or touched by the user. Alternatively, the user input unit 130 may be implemented as a wheel, a jog dial, or a joystick.

The first user input unit 130a may allow the user to input commands (such as 'start', 'end', and 'send'), the second user input unit 130b may be used to switch from one operating mode to another, and the third user input unit 130c may be used as a hot key for activating certain functions of the mobile terminal 100.

When the user's finger approaches the display module 151, the proximity sensor 141 may detect the user's finger and may output a proximity signal. The proximity signal output by the proximity sensor 141 may vary according to the distance between the display module 151 and the user's finger. More specifically, the mobile terminal 100 may include more than one proximity sensor 141 having different sensing ranges. In this case, it is possible to determine the distance between the display module 151 and the user's finger by comparing a plurality of proximity signals respectively provided by the proximity sensors 141. In addition, it is possible to determine what part of the display unit 151 is being approached by the user's finger and whether the user's finger is moving within a close range of the display unit 151 by determining which of the proximity sensors 141 outputs a proximity signal. Therefore, the controller 180 may choose a touch key corresponding to part of the display unit 151 approached by the user's finger and may thus control the vibration module 157 to output a vibration signal corresponding to the chosen touch key.

If the user tilts or shakes the mobile terminal 100, the gyro-sensor 142 may detect the motion of the mobile terminal 100. Thereafter, the gyro-sensor 142 may generate a signal corresponding to the results of the detection and may output the signal to the controller 180. Then, the controller 180 may acquire various information regarding the movement of the mobile terminal 100 such as the direction, angle, velocity, and magnitude of the movement of the mobile terminal 100 and a current location of the mobile terminal from the signal generated by the gyro-sensor 142.

The controller 180 may keep track of the movement of the mobile terminal 100 based on the information acquired from the signal generated by the gyro-sensor 142. The type of information that can be acquired from the signal generated by the gyro-sensor 142 may vary according to the type of the gyro-sensor 142. Thus, a gyro-sensor 142 capable of providing desired information may be included in the mobile terminal 100. The mobile terminal 100 may include at least one gyro-sensor 142. The controller 180 may control the gyro-sensor 142 to be driven only when a certain application is executed.

Figure 3:
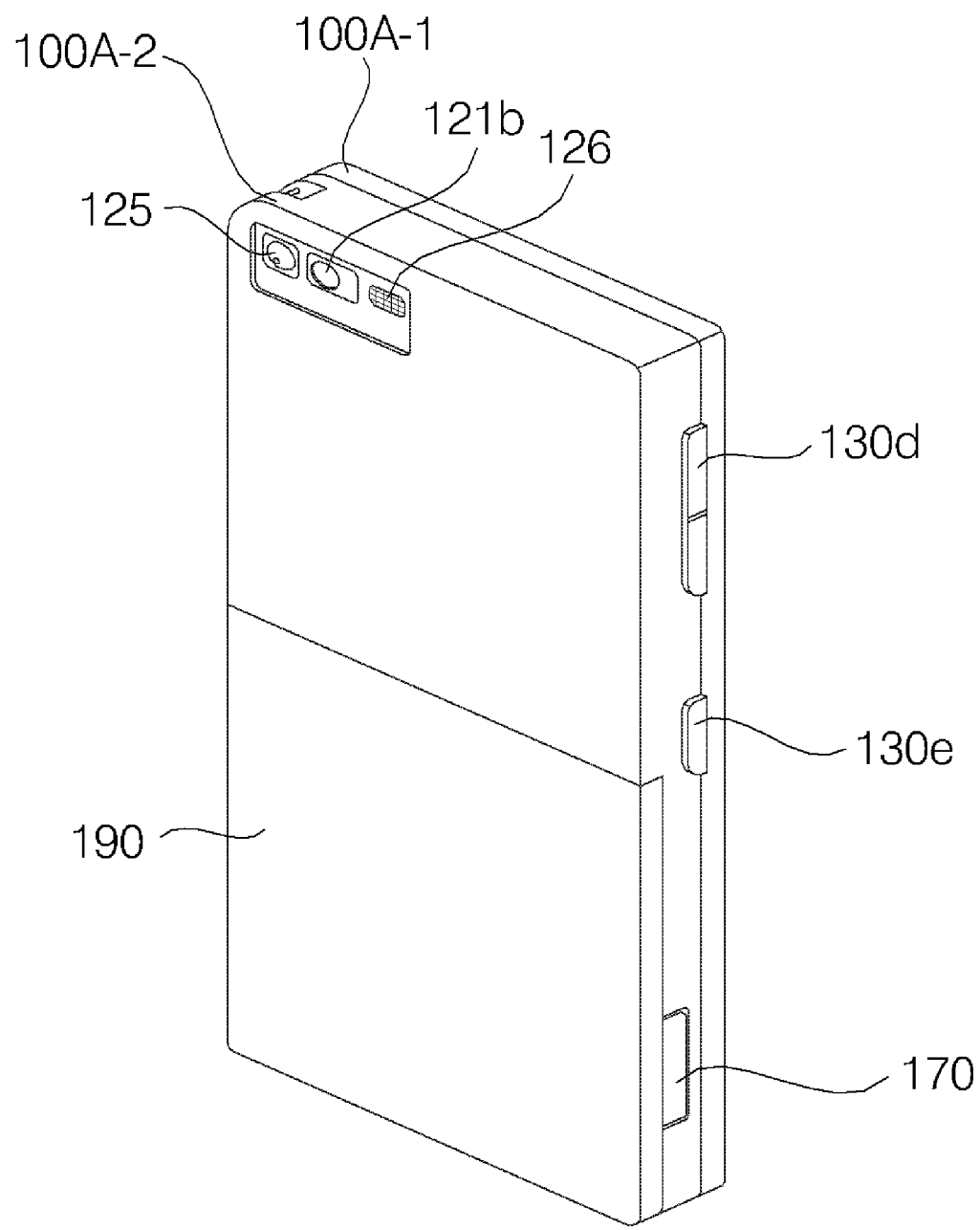
FIG. 3 illustrates a rear perspective view of the mobile terminal shown in FIG. 1.

FIG. 3 illustrates a rear perspective view of the mobile terminal 100 shown in FIG. 2. Referring to FIG. 3, a fourth user input unit 130d, a fifth user input unit 130e and the interface unit 170 may be disposed on one side of the rear case 100A-2, and a second camera 121b may be disposed at the rear of the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a cameral flash 126 may be disposed near the second camera 121b. The mirror 125 may be used for the user to prepare himself or herself for taking a self shot. The cameral flash 126 may be used to illuminate a subject when the user attempts to capture an image of the subject with the second camera 121b.

A second audio output module (not shown) may be additionally provided in the rear case 100A-2. The second audio output module may realize a stereo function along with the first audio output module 153a. The second audio output module may also be used during a speaker-phone mode.

An antenna (not shown) for receiving a broadcast signal may be disposed on one side of the rear case 100A-2. The antenna may be installed so as to be able to be pulled out of the rear case 100A-2.

The interface unit 170 may serve as a path for allowing the mobile terminal 100 to exchange data with an external device. For example, the interface unit 170 may be a connector for connecting an earphone to the mobile terminal 100 in an either wired or wireless manner, a port for short-range communication or a power supply port for supplying power to the mobile terminal 100. The interface unit 170 may be a card socket for accommodating an exterior card such as a SIM or UIM card or a memory card.

The second camera 121b and the other elements that have been described as being provided on the rear case 100A-2 may be provided on the front case 100A-1.

In addition, the first camera 121a may be configured to be rotatable and thus to cover the photographing direction of the second camera 121b. In this case, the second camera 121b may be optional.

The power supply unit 190 may be disposed in the rear case 100A-2. The power supply unit may be a rechargeable battery and may be coupled to the rear case 100A-2 so as to be attachable to or detachable from the rear case 100A-2.

Figure 4:
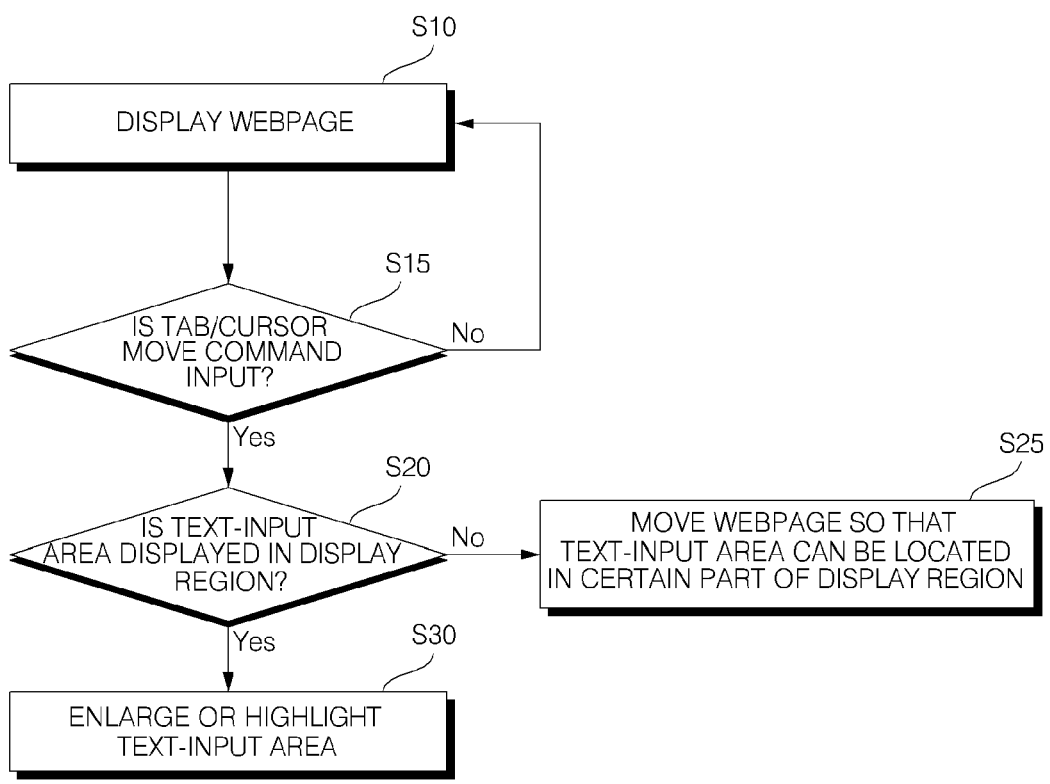
FIG. 4 illustrates a flowchart of a method of controlling a mobile terminal according to an exemplary embodiment of the present invention.

FIG. 4 illustrates a flowchart of a method of controlling a mobile terminal according to an exemplary embodiment of the present invention. Referring to FIG. 4, the controller 180 may display a webpage in a display region (S10). More specifically, the controller 180 may execute a web browser. A webpage may be displayed in the web browser. An address window to which the address of a desired webpage can be input may be displayed in the web browser.

The controller 180 may determine whether a tab/cursor move command has been input (S15). It may be determined that the tab/cursor move command has been generated if at least one of a hard key, a joystick, a jog wheel, a trackball, and a soft key displayed in the display region is manipulated. More specifically, if a gyro signal is generated in response to the detection of the movement of the mobile terminal 100 by the gyro-sensor 142, it may be determined that the tab/cursor move command has been input.

If it is determined in operation S15 that the tab/cursor move command has been input, the controller 180 may determine whether a text-input area into which text can be input is displayed in the display region (S20). The text-input area may be at least one of a search window, an identifier (ID)/password input window, and a text-input window for a bulletin board included in the displayed webpage and an address window displayed in the web browser.

If the text-input area is yet to be displayed in the display region, the controller 180 may move the displayed webpage or the display window of the web browser such that the text-input area can be displayed in the display region (S25).

On the other hand, if the text-input area is displayed in the display region, the controller 180 may enlarge or highlight the text-input area (S30). In this manner, the user may easily input text into the text-input area.

FIGS. 5 through 19 illustrate diagrams for explaining the method shown in FIG. 4.

Figure 5:
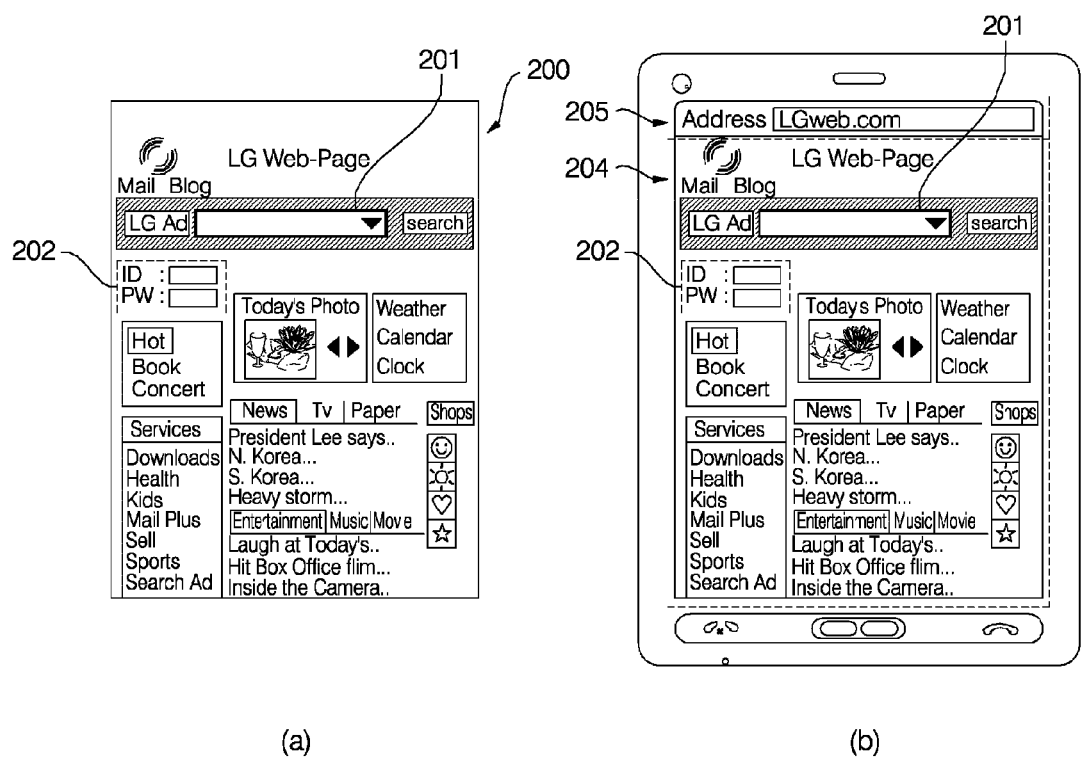
FIG. 5 illustrates diagrams for explaining how to display a webpage in a display region of the mobile terminal shown in FIG. 1.

FIG. 5 illustrates diagrams for explaining how to display a webpage in the display region of the mobile terminal 100. Referring to FIGS. 5(a) and 5(b), a webpage 200 including a search window 201 and an ID/password input window 202 may be displayed in the display region of the mobile terminal 100, as indicated by reference numeral 204.

In order to display the webpage 200 in the display region of the mobile terminal 100, the controller 180 may execute a web browser. Referring to FIG. 5(b), an address window 205 into which the address of a webpage can be input may be displayed above the webpage 200. The search window 201, the ID/password input window 202 and the address window 205 may all be classified as text-input areas.

Figure 6:
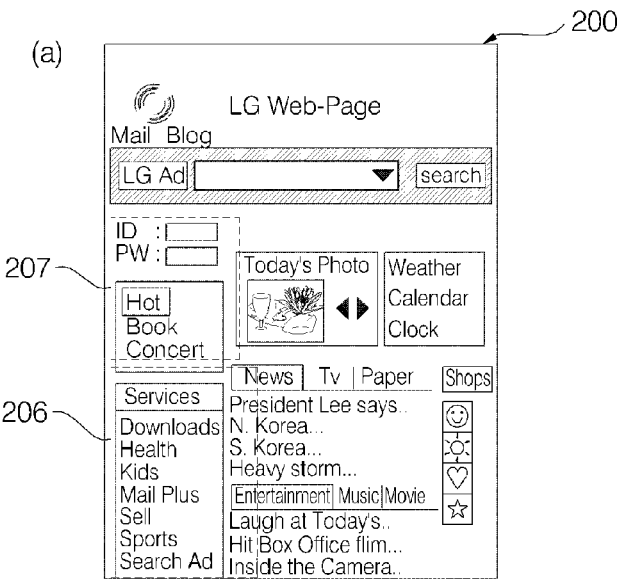
FIG. 6 illustrates diagrams for explaining how to move a webpage display region in response to a tab/cursor move command.
Figure 6:
Figure 6:
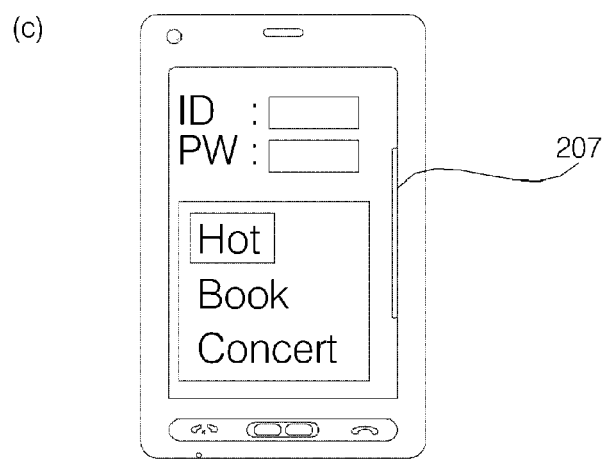

FIG. 6 illustrates diagrams for explaining how to move a webpage in response to a tab/cursor move command. Referring to FIGS. 6(a) and 6(b), a webpage 200 may be displayed in the display region of the mobile terminal 100. Since the webpage 200 is too large to be displayed as a whole in the display region of the mobile terminal 100, only a portion 206 of the webpage 200 may appear in the display region of the mobile terminal 100, as shown in FIG. 6(b). If a tab/cursor move command is detected when the webpage portion 206 appears in the display region of the mobile terminal 100, the controller 180 may move the webpage 200 such that a webpage portion 207 including a text-input area can appear in the display region of the mobile terminal 100, as shown in FIG. 6(c).

More specifically, referring to FIG. 6(b), the webpage portion 206 does not include any text-input area. If a tab/cursor move command is input when a webpage portion including no text-input area appears in the display region of the mobile terminal 100, the controller 180 may move the webpage 200 such that a webpage portion including a text-input area (such as an ID/password input window) can appear in the display region of the mobile terminal 100, as shown in FIG. 6(c).

The controller 180 may change the scale of display of the webpage 200 when moving the webpage 200 in response to a tab/cursor move command. As a result, referring to FIGS. 6(a) and 6(b), the scale of display of the webpage portion 207 may be different from the scale of display of the webpage portion 206. More specifically, the controller 180 may increase the scale of display of the webpage 200 so that the ID/password input window of the webpage 200 can be properly displayed in the display region of the mobile terminal 100.

In this manner, the user may be able to easily identify the ID/password input window of the webpage 200. The scale of display of the webpage 200 may be determined by user settings or the size of the display region of the mobile terminal 100.

Figure 7:
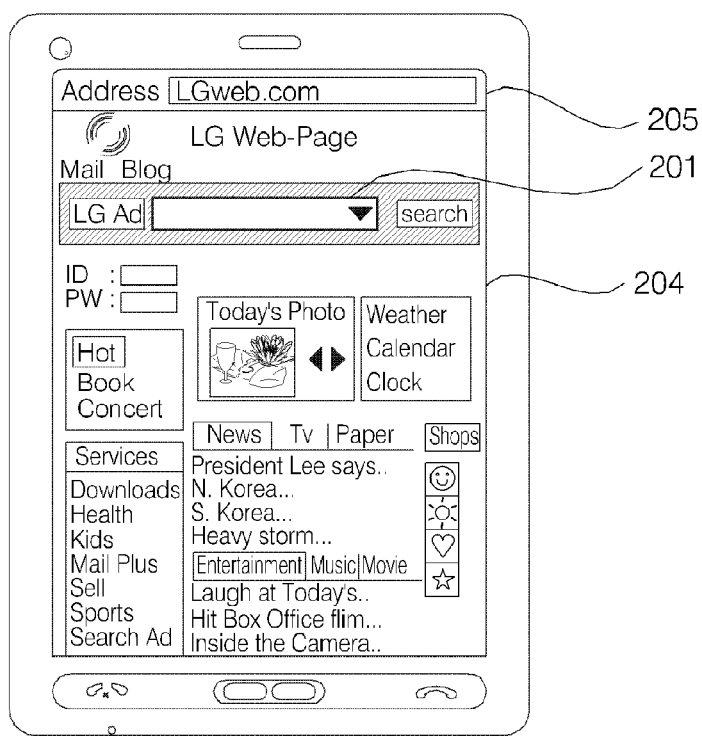
FIGS. 7 and 8 illustrate diagrams for explaining how to enlarge a webpage in response to a tab/cursor move command and then display a keyboard.
Figure 7:
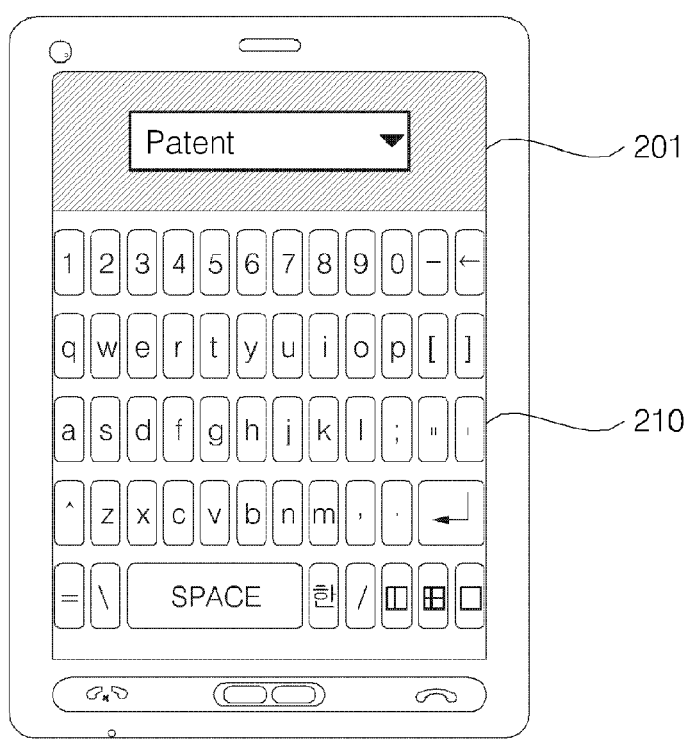
Figure 8:
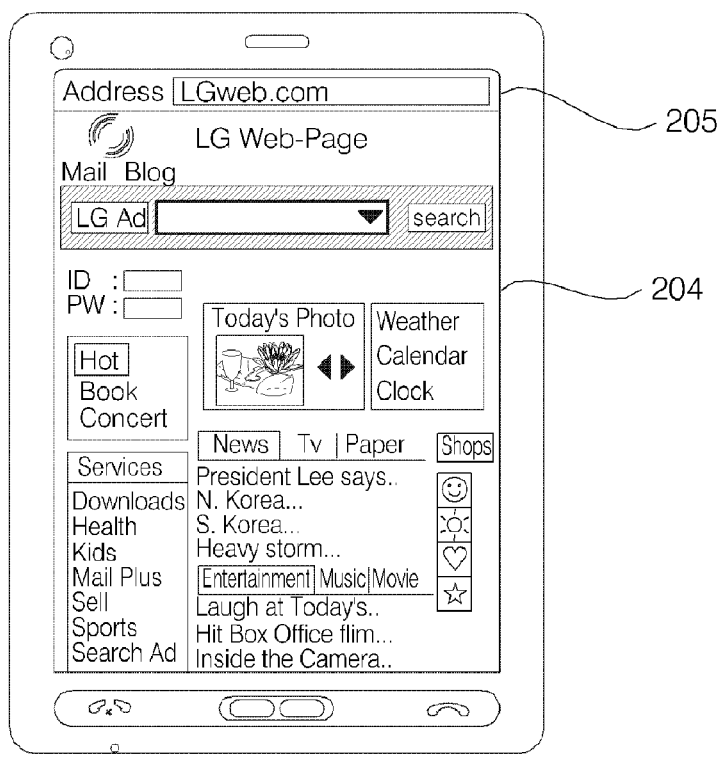
Figure 8:
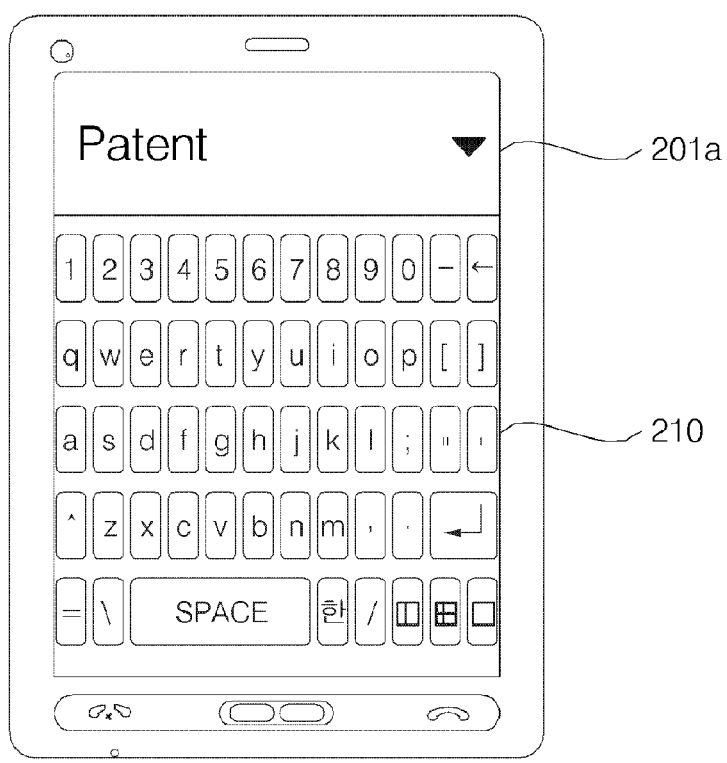

FIGS. 7 and 8 illustrate diagrams for explaining how to enlarge a webpage in response to a tab/cursor move command and then display a keyboard. Referring to FIG. 7(a), the controller 180 may display a webpage 204 in the display region of the mobile terminal 100. The webpage 204 may include three text-input areas: a search window 201, an ID/password input window and an address window 205.

If a tab/cursor move command is detected when the webpage 204 is displayed in the display region of the mobile terminal 100, the controller 180 may move the webpage 204 in response to the tab/cursor move command so that one of the three text-input areas of the webpage 204 can be located in a certain part of the display region of the mobile terminal 100. Alternatively, the controller 180 may enlarge or highlight one of the three text-input areas of the webpage 204.

For example, referring to FIG. 7(b), the controller 180 may enlarge a portion of the webpage 204 including the search window 201 in response to the tab/cursor move command. In addition, the controller 180 may move the webpage 204 so that the search window 201 can be located in a certain part (for example, in an upper central part) of the display region of the mobile terminal 100.

Thereafter, the controller 180 may display a keyboard 210 in the display region of the mobile terminal 100. In this manner, the user may be able to input any desired search word into the search window 201 by using the keyboard 210.

The controller 180 may display at least one of a keyboard, a keypad and a handwriting input window. The keyboard 210 may be set to automatically disappear after the lapse of a predefined amount of time.

Referring to FIG. 8(a), if a tab/cursor move command is detected when the webpage 204 is displayed in the display region of the mobile terminal 100, the controller 180 may enlarge one of the text-input areas of the webpage 204.

For example, referring to FIG. 8(b), the controller 180 may display only a text-input window 201a of the search window 201 in the display region of the mobile terminal 100. In this manner, the user may be able to easily input text into the text-input window 201a by using the keyboard 210.

Figure 9:
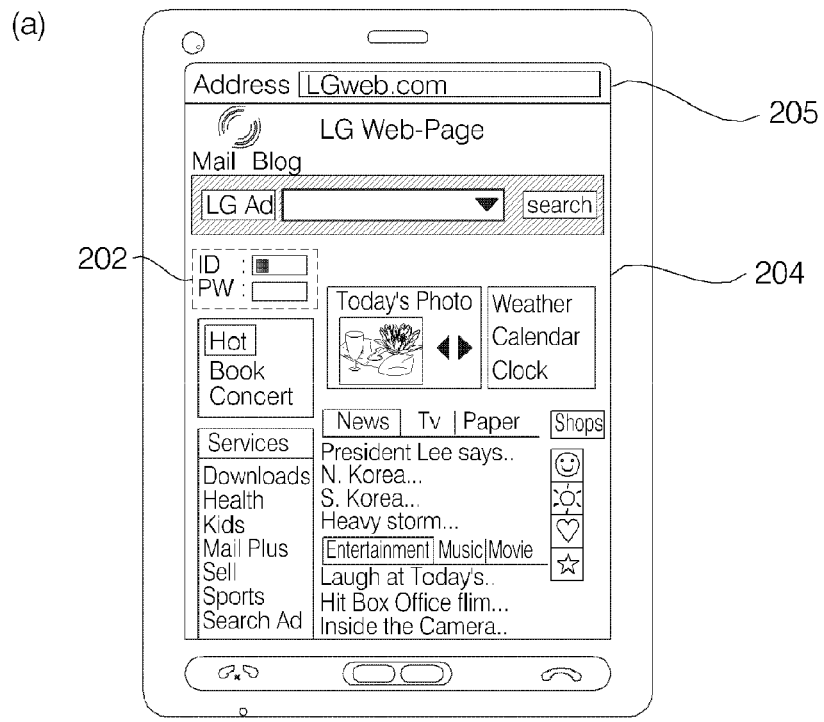
FIG. 9 illustrates diagrams for explaining how to move a cursor on a webpage in response to a tab/cursor move command.
Figure 9:
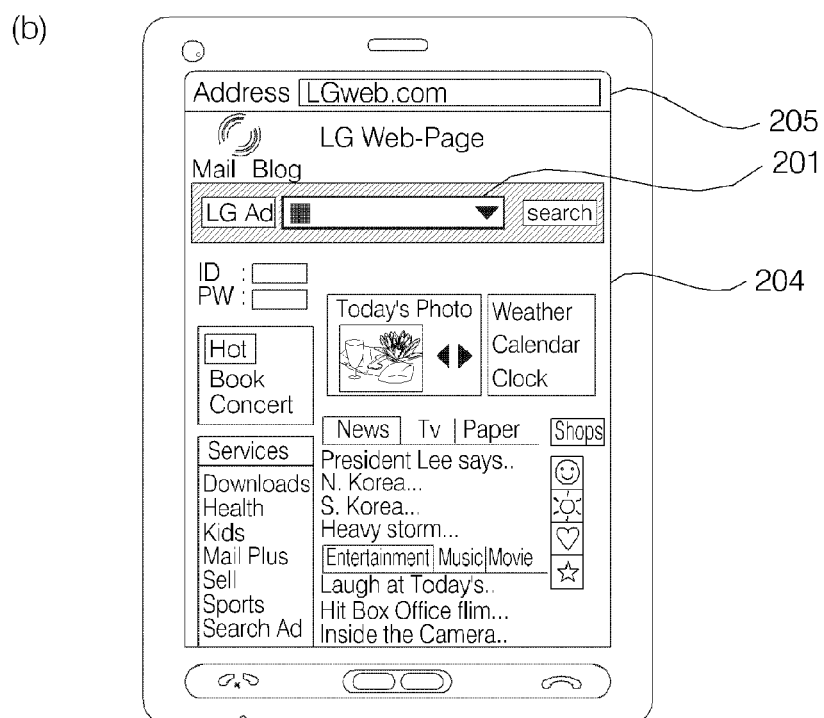

FIG. 9 illustrates diagrams for explaining how to move a cursor on a webpage in response to a tab/cursor move command. Referring to FIG. 9(a), a webpage 204 including an ID/password input window 202 and a search window 205 may be displayed in the display region of the mobile terminal 100. If a cursor is placed over the ID/password input window 202, the controller 180 may highlight the ID/password input window 202.

Thereafter, if a tab/cursor move command is detected, the controller 180 may move the cursor to another text-input window and may then highlight the text-input window currently being pointed at by the cursor.

For example, referring to FIG. 9(b), if a tab/cursor move command is detected when the ID/password input window 202 is highlighted, the controller 180 may highlight the search window 201, and may move the cursor over to the search window 201. In this manner, the user may be able to easily input text into the search window 201.

Figure 10:
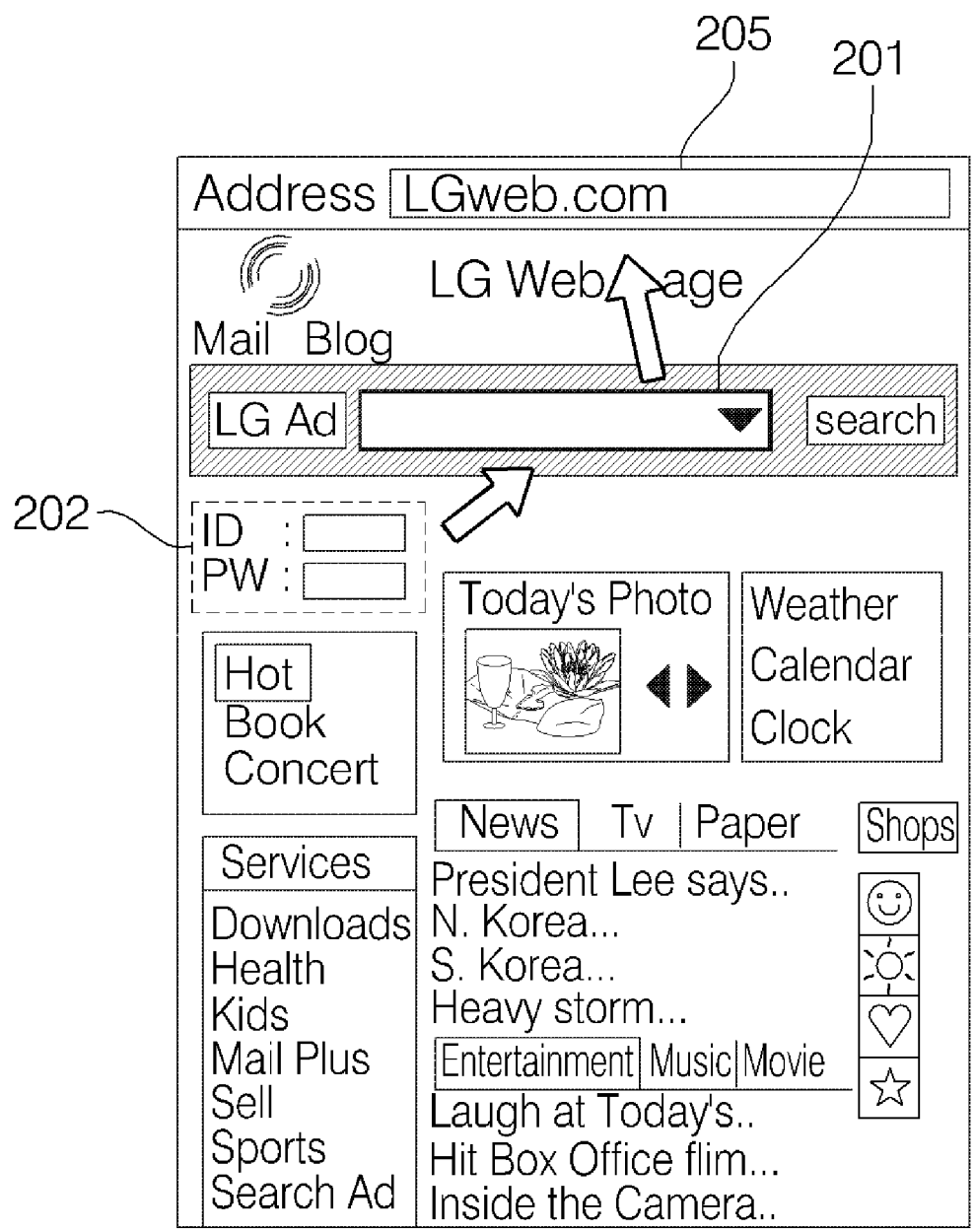
FIG. 10 illustrates a diagram for explaining how to move and enlarge a webpage in response to the number of times a tab/cursor move command has been input.

FIG. 10 illustrates a diagram for explaining how to move and enlarge a webpage in response to more than one tab-cursor move command. Referring to FIG. 10, if a tab/cursor move command is detected for the first time when a webpage including a search window 201, an ID/password input window 202 and an address window 205 is displayed in the display region of the mobile terminal 100, the controller 180 may enlarge and display an ID/password input window 202 in a certain part of the display region of the mobile terminal 100. Thereafter, if the tab/cursor move command is detected again, the controller 180 may enlarge and display a search window 201 in the certain part of the display region of the mobile terminal 100 instead of the ID/password input window 202. Thereafter, if the tab/cursor move command is detected again, the controller 180 may enlarge and display an address window 205 in the certain part of the display region of the mobile terminal 100 instead of the search window 201.

In this manner, the user may be able to sequentially enlarge and display a number of text-input areas of a webpage in a certain part of the display region of the mobile terminal 100 simply by manipulating the mobile terminal 100 (particularly, a hard key of the mobile terminal 100) a number of times. Alternatively, the controller 180 may enlarge a webpage but simply move the webpage based on a number of times that a tab/cursor move command has been input.

Figure 11:
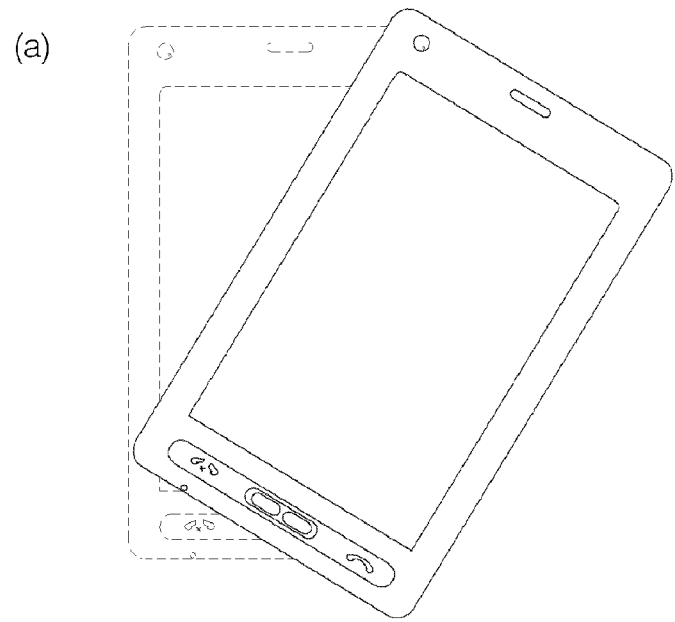
FIGS. 11 and 12 illustrate diagrams for explaining how to move a webpage in response to the movement of the mobile terminal shown in FIG. 1.
Figure 11:
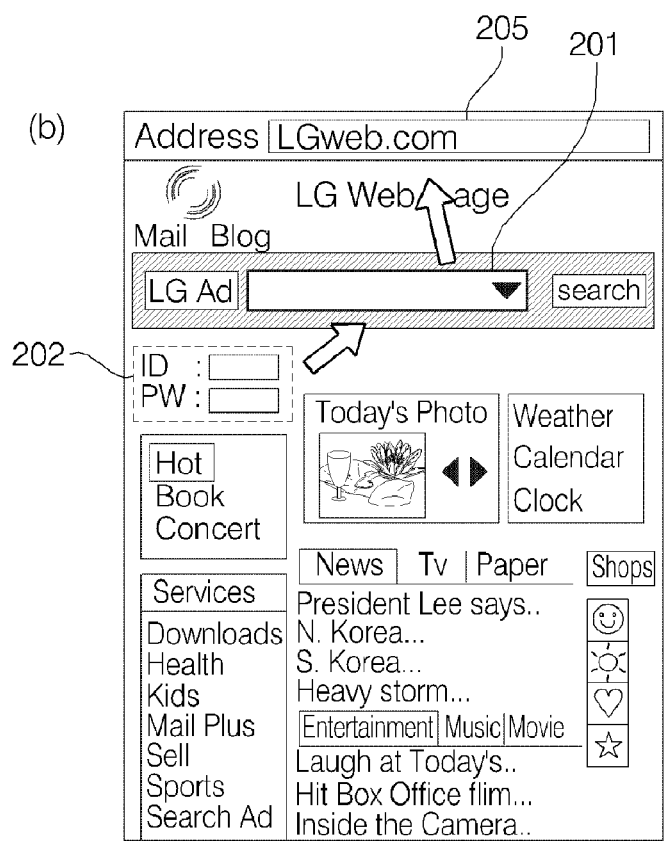
Figure 12:
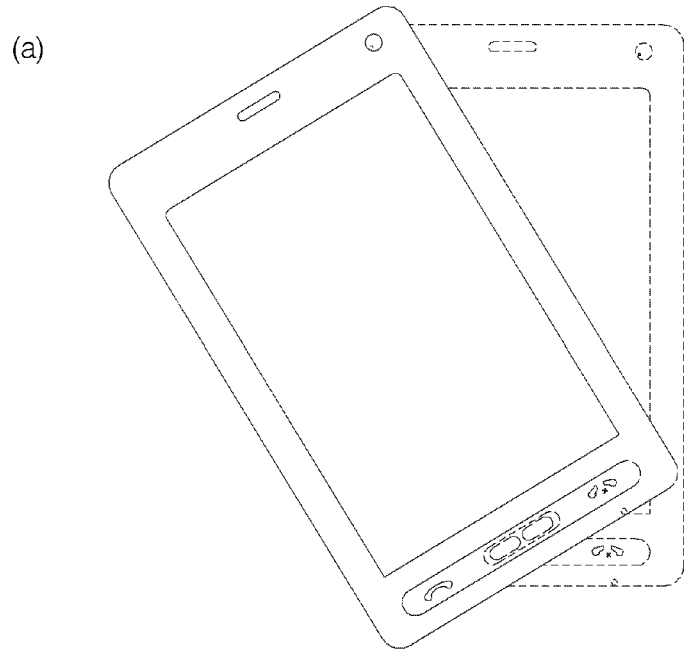
Figure 12:
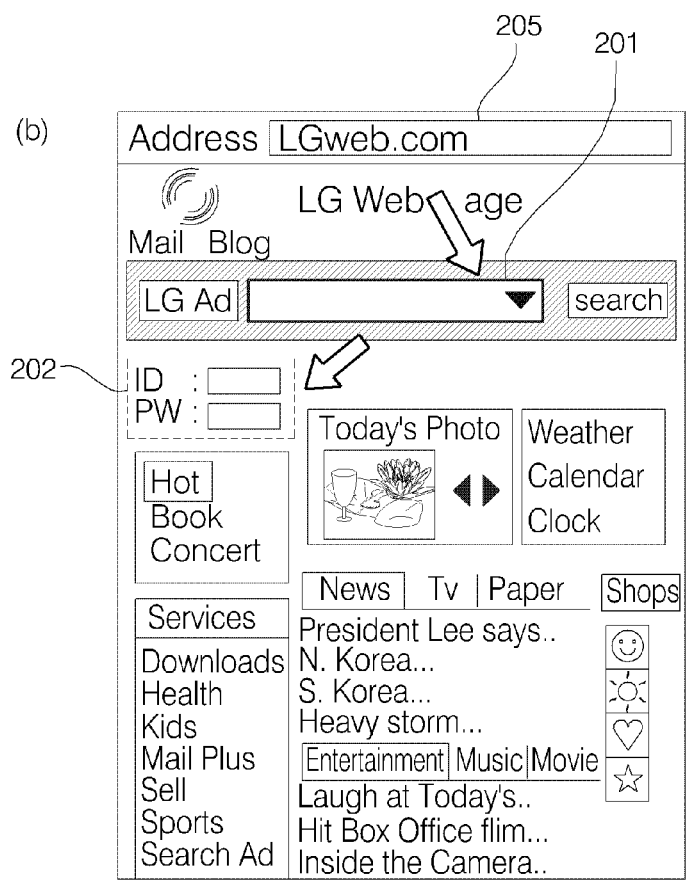

FIGS. 11 and 12 illustrate diagrams for explaining how to move a webpage in response to the movement of the mobile terminal 100. Referring to FIG. 11(a), if the mobile terminal 100 is tilted to the right by a predetermined angle, the gyro-sensor 142 may recognize the movement of the mobile terminal 100 and may thus generate a gyro signal.

Then, the controller 180 may determine that a tab/cursor move command has been input based on the gyro signal.

If the mobile terminal 100 is maintained to be tilted to the right, the controller 180 may determine that the tab/cursor move command is repeatedly being input. Thus, referring to FIG. 11(b), the controller 180 may sequentially enlarge and display an ID/password input window 202, a search window 201 and an address window 205 in a certain part of the display region of the mobile terminal 100.

On the other hand, referring to FIG. 12(a), if the mobile terminal 100 is tilted to the left by a predetermined angle, the gyro-sensor 142 may recognize the tilting of the mobile terminal 100 and may thus generate a gyro signal.

Then, the controller 180 may identify that the mobile terminal 100 has been tilted to the left, and may either move the webpage displayed in the display region of the mobile terminal 100 or enlarge or highlight the address window 205, the search window 201 and the ID/password input window 202. In this case, the direction in which the webpage displayed in the display region of the mobile terminal 100 is moved in response to the movement of the mobile terminal 100 may be determined by the direction of the movement of the mobile terminal 100.

If the mobile terminal 100 is maintained to be tilted to the left, the controller 180 may determine that the tab/cursor move command is repeatedly being input. Thus, referring to FIG. 12(b), the controller 180 may sequentially enlarge and display the address window 205, the search window 201 and the ID/password input window 202 in a certain part of the display region of the mobile terminal 100.

The controller 180 may extract motion information such as the moving speed and direction of the mobile terminal 100 and the number of times the mobile terminal 100 has been moved from a gyro signal generated by the gyro-sensor 142. Thereafter, the controller 180 may determine how many times the tab/cursor move command has been input and the speed at which the tab/cursor move command has been input based on the extracted motion information. Thereafter, the controller 180 may move the webpage displayed in the display region of the mobile terminal 100 or may enlarge or highlight one of a number of text-input areas included in the webpage displayed in the display region of the mobile terminal 100 based on the results of the determination.

For example, if the user shakes the mobile terminal 100 twice, the controller 180 may determine that the tab/cursor move command has been input twice in a row. If the tab/cursor move command is input twice in a row when the ID/password input window 202 is displayed in a certain part of the display region of the mobile terminal 100, the controller 180 may display the address window 205 in the certain part of the display region of the mobile terminal 100 instead of the ID/password input window 202.

If the user rotates or shakes the mobile terminal 100 at high speed, the controller 180 may determine that the tab/cursor move command has been input at high speed. Therefore, the controller 180 may quickly enlarge and display the ID/password input window 202, the search window 201 and the address window 205 one after another in a certain part of the display region of the mobile terminal 100.

The movement, enlargement and highlighting of a webpage in response to motion information of the mobile terminal 100 and the movement of a cursor may be performed in various manners, other than those set forth herein, and thus do not restrict the scope of the present invention.

Figure 13:
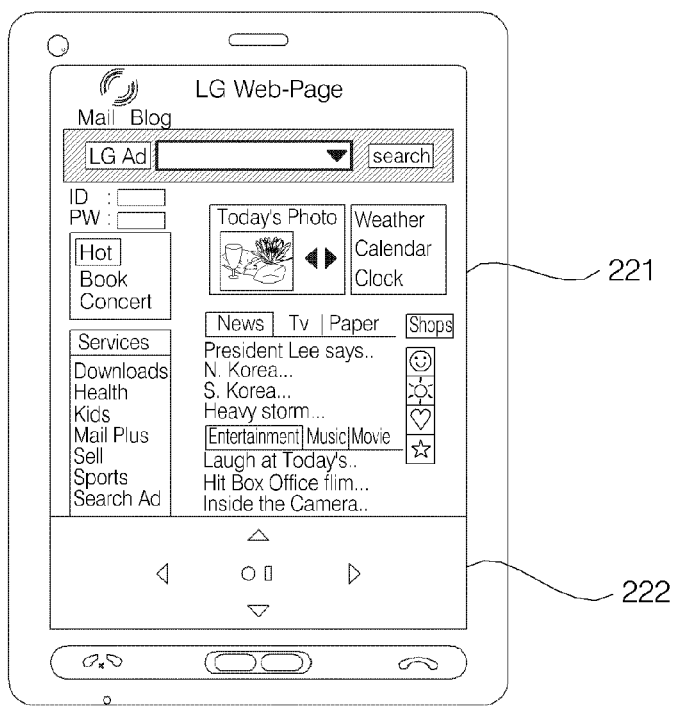
FIGS. 13 and 14 illustrate diagrams for explaining how to display a keyboard on a touch screen in response to a tab/cursor move command.
Figure 13:
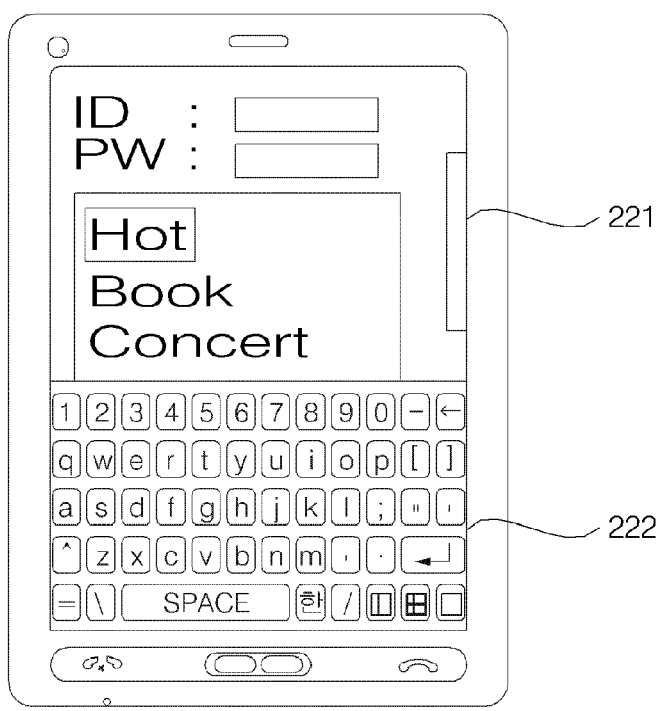
Figure 14:
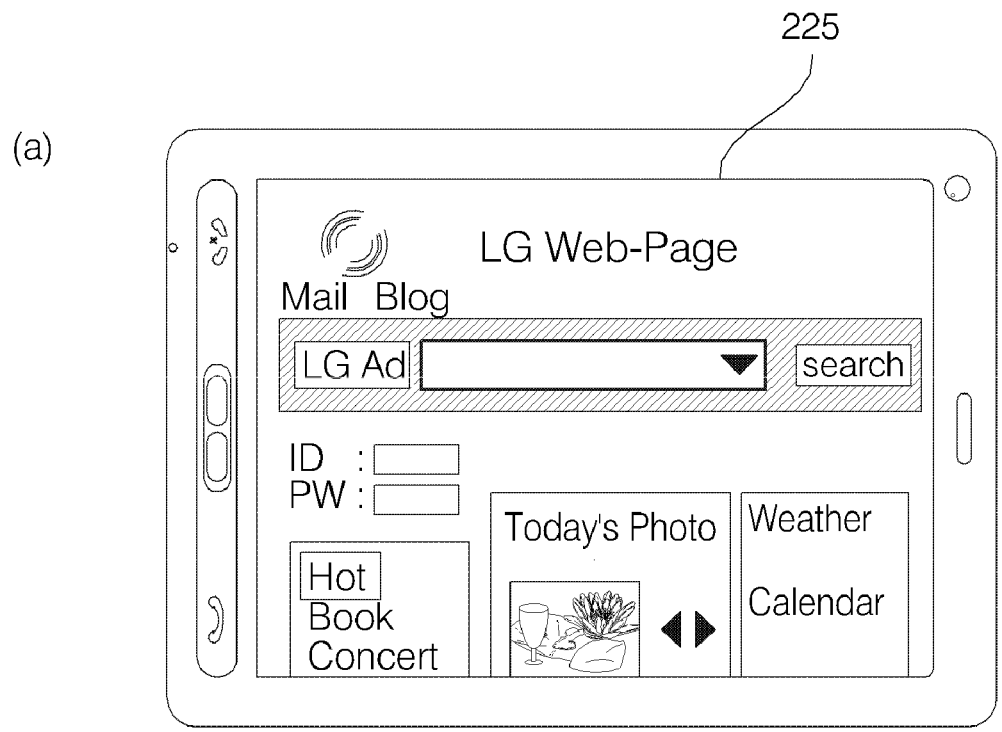
Figure 14:
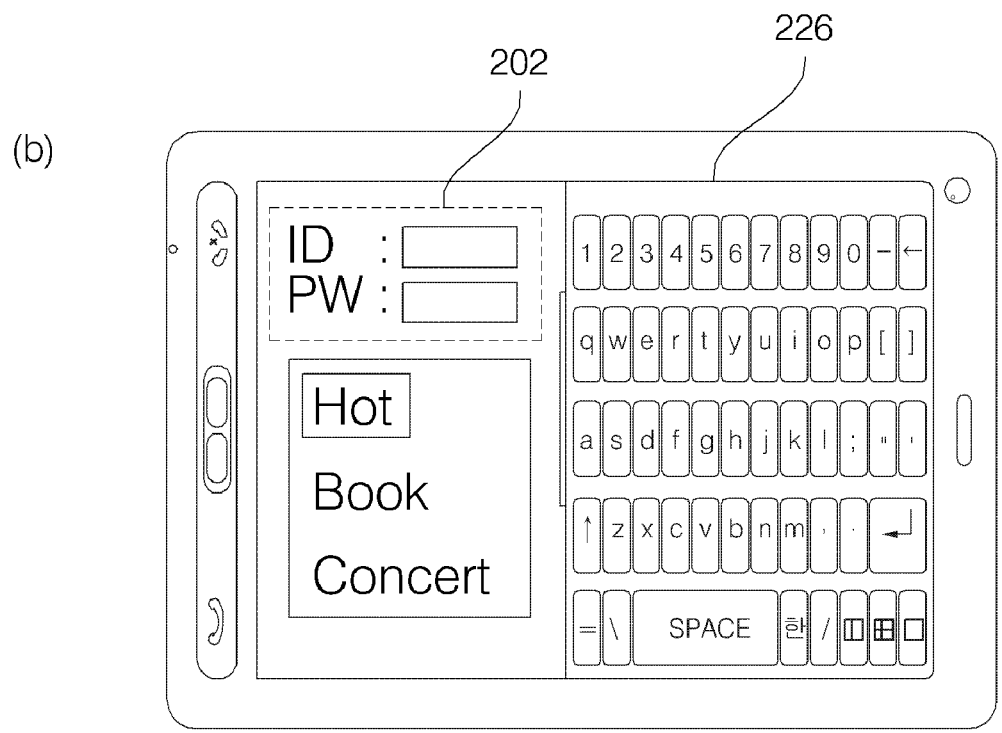

FIGS. 13 and 14 illustrate diagrams for explaining how to display a keyboard on a touch screen in response to a tab/cursor move command. Referring to FIG. 13(a), the display region of the mobile terminal 100 may be divided into two sub-display regions: first and second sub-display regions 221 and 222. The controller 180 may display a webpage in the first sub-display region 221, and may display a plurality of soft keys for inputting various control commands to the mobile terminal 100 in the second sub-display region 222.

Referring to FIG. 13(b), if a tab/cursor move command is detected, the controller 180 may enlarge and display an ID/password input window in the first sub-display region 221, and may display a keyboard in the second sub-display region 222. In this manner, the user may be able to easily input text to the mobile terminal 100 by using the keyboard.

Thereafter, referring to FIG. 14(a), if the mobile terminal 100 is tilted to the right by 90 degrees, the controller 180 may display an upper portion 255 of the webpage horizontally.

Thereafter, referring to FIG. 14(b), if the tab/cursor move command is detected again, the controller 180 may display an ID/password input window 202 on the left side of the display region of the mobile terminal 100, and may display a keyboard 226 on the right side of the display region of the mobile terminal 100. Thus, the user may input text into the ID/password input window 202 by using the keyboard 226.

In short, the controller 180 may display a keyboard in the display region of the mobile terminal 100 while preventing the keyboard from overlapping any text-input area.

The controller 180 may display various text-input windows, other than a keyboard, such as a keypad and a handwriting input window.

Figure 15:
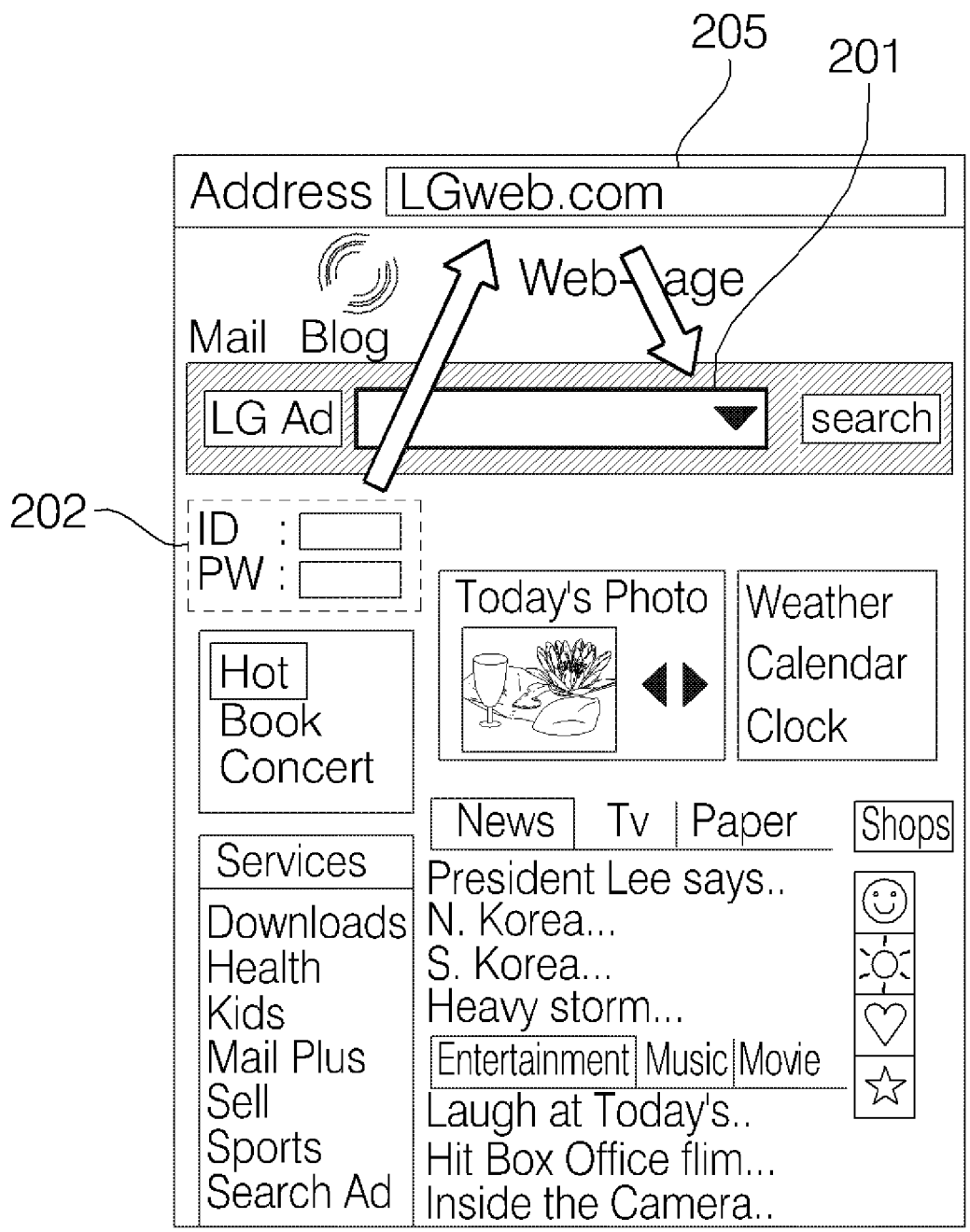
FIGS. 15 and 16 illustrate diagrams for explaining how to set the order in which a plurality of text-input areas are to be enlarged and displayed or to be highlighted in response to a tab/cursor move command.
Figure 16:
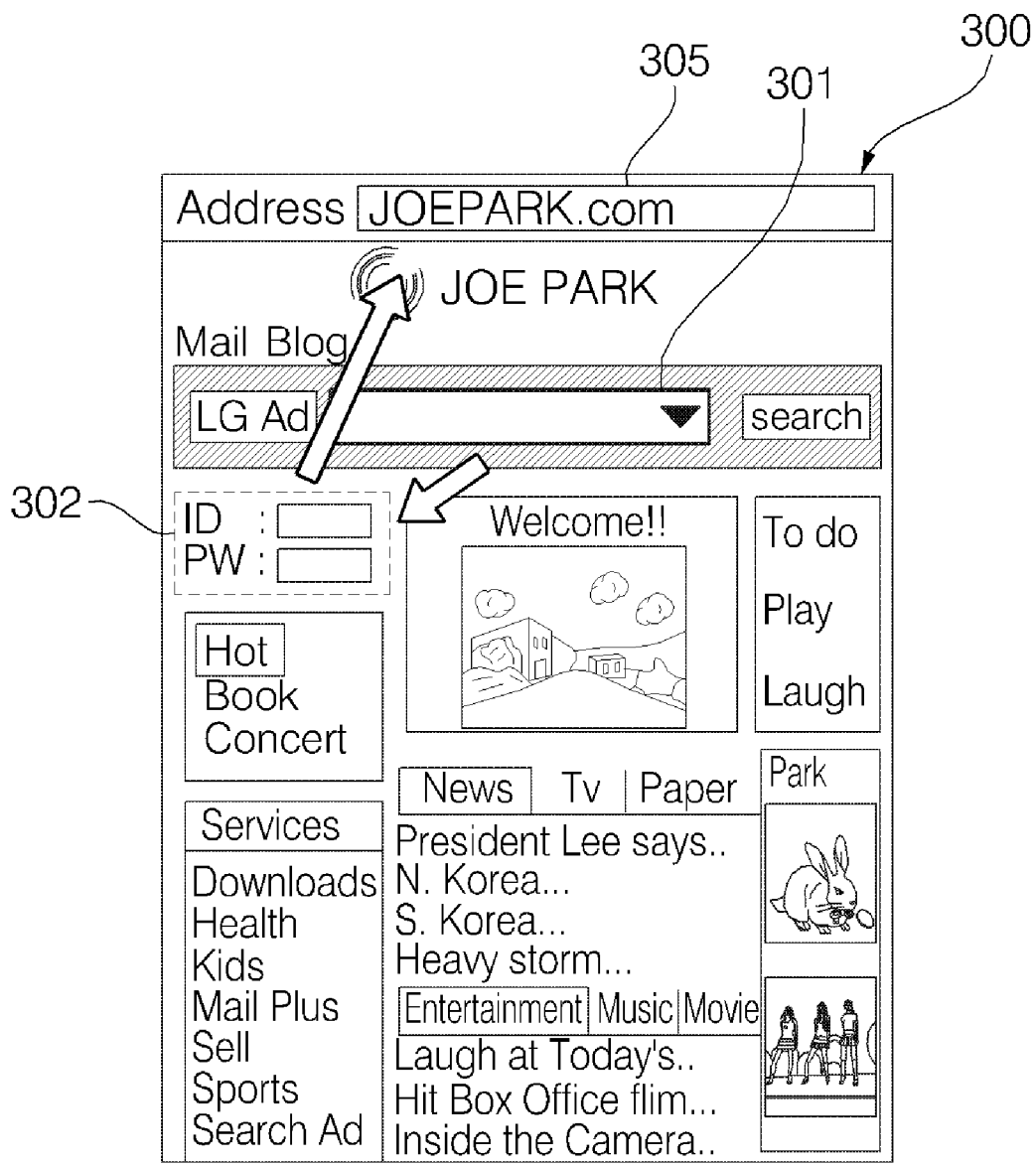

FIGS. 15 and 16 illustrate diagrams for explaining how to set the order in which a plurality of text-input areas are to be enlarged and displayed or to be highlighted in response to a tab/cursor move command. Referring to FIG. 15, if a webpage including at least two text-input areas is to be displayed in the display region of the mobile terminal 100, the user may set the order in which the text-input areas are to be displayed in a certain part of the display region of the mobile terminal 100 or to be enlarged or highlighted. Then, the controller 180 may sequentially enlarge and display the text-input areas in a certain part of the display region of the mobile terminal 100 or sequentially highlight the text-input areas in the order set by the user in consideration of the number of times a tab/cursor move command has been input thereto.

More specifically, if a tab/cursor move command is input for the first time, the controller 180 may enlarge and display an ID/password input window 202 in a certain part of the display region of the mobile terminal 100. Thereafter, if the tab/cursor move command is input again, the controller 180 may enlarge and display an address window 205 in the certain part of the display region of the mobile terminal 100 instead of the ID/password input window 202. Thereafter, if the tab/cursor move command is input again, the controller 180 may enlarge and display a search window 201 in the certain part of the display region of the mobile terminal 100 instead of the address window 205.

In this manner, the user may be able to effectively enlarge and display or effectively highlight a plurality of text-input areas included in each webpage by setting the order in which the text-input areas are to be enlarged and displayed or to be highlighted.

Referring to FIG. 16, the user may set different orders in which to enlarge or highlight a plurality of text-input areas for different webpages and may store the different orders. Thus, a plurality of text-input areas included in a webpage 300 may be enlarged and displayed or may be highlighted in a different order from that used to enlarge and display or to highlight the text-input areas included in the webpage shown in FIG. 15.

More specifically, referring to FIG. 16, if a tab/cursor move command is input for the first time, the controller 180 may enlarge and display a search window 301 in a certain part of the display region of the mobile terminal 100. Thereafter, if the tab/cursor move command is input again, the controller 180 may enlarge and display an ID/password input window 302 in the certain part of the display region of the mobile terminal 100 instead of the search window 301. Thereafter, if the tab/cursor move command is input again, the controller 180 may enlarge and display an address window 305 in the certain part of the display region of the mobile terminal 100 instead of the ID/password input window 302.

Figure 17:
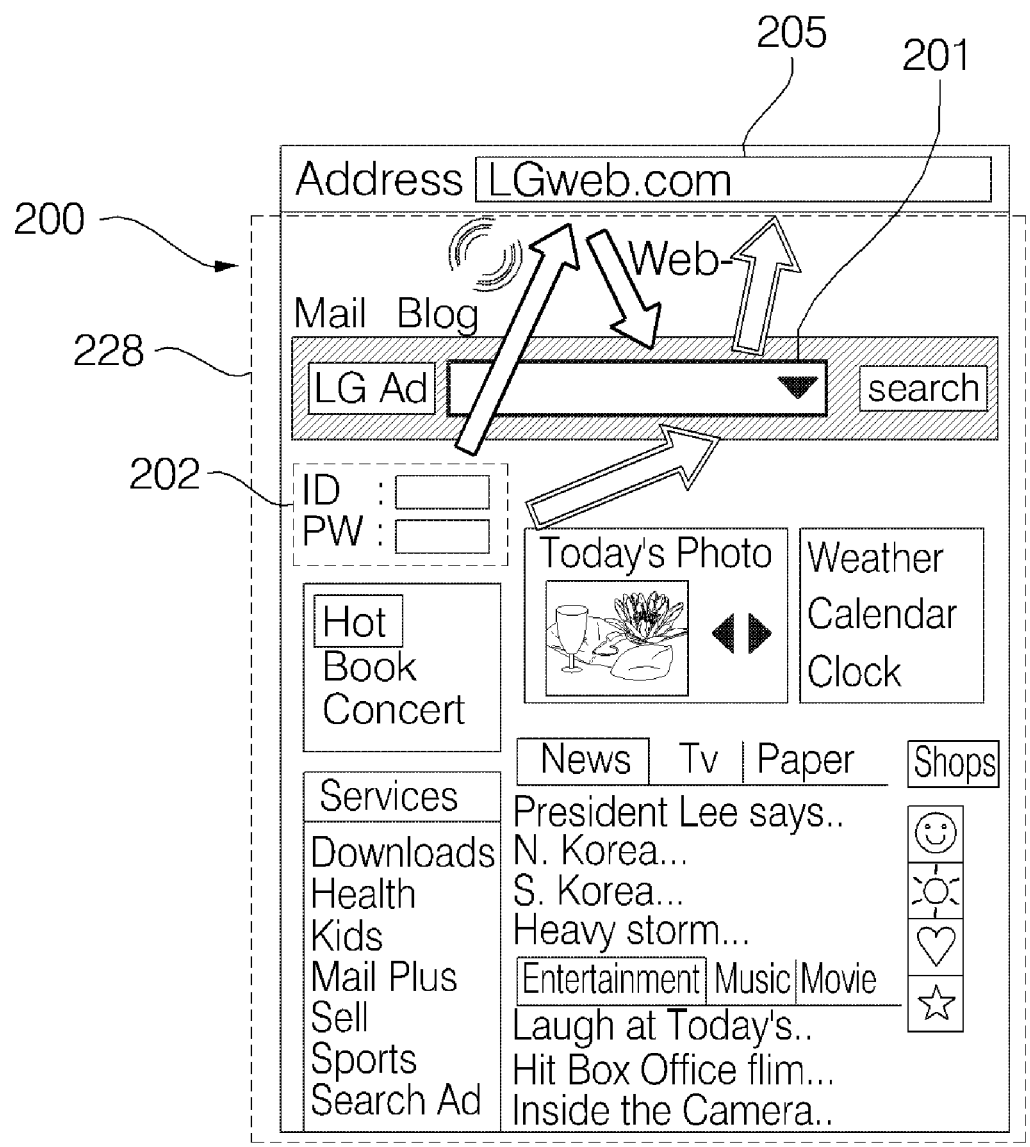
FIG. 17 illustrates a diagram for explaining how to sequentially enlarge and display a plurality of text-input areas included in a webpage or to sequentially highlight the text-input areas.

FIG. 17 illustrates a diagram for explaining how to sequentially enlarge and display a plurality of text-input areas included in a webpage or to sequentially highlight the text-input areas. Referring to FIG. 17, a webpage 200 may be displayed in the display region of the mobile terminal 100. Since the webpage 200 is too large to be displayed as a whole in the display region of the mobile terminal 100, only a portion 228 of the webpage 200 may appear in the display region of the mobile terminal 100, and an address window 205 may be hidden from view.

The controller 180 may enlarge and display or highlight a plurality of text-input areas included in the webpage 200 in the order indicated by arrows in response to the detection of a tab/cursor move command. In this case, a text-input area currently being displayed in the display region of the mobile terminal 100 may be enlarged or highlighted earlier than a text-input area currently not being displayed in the display region of the mobile terminal 100.

More specifically, if a tab/cursor move command is input for the first time, the controller 180 may enlarge and display an ID/password input window 202 in a certain part of the display region of the mobile terminal 100. Thereafter, if the tab/cursor move command is input again, the controller 180 may enlarge and display a search window 201 in the certain part of the display region of the mobile terminal 100 instead of the address window 205. Thereafter, if the tab/cursor move command is input again, the controller 180 may enlarge and display the address window 205 in the certain part of the display region of the mobile terminal 100 instead of the search window 201.

In addition, if the motion of the mobile terminal 100 is detected when the address window 205 is enlarged and displayed in the certain part of the display region of the mobile terminal 100 or is highlighted, the controller 180 may display a list of webpages registered as Favorites by the user or a list of webpages that have been visited by the user in the display region of the mobile terminal 100 and may control the displayed webpage list to be scrolled through.

For example, referring to FIG. 18(a), if the user tilts the mobile terminal 100 to the right when the address window 205 is pointed at by a cursor, the gyro-sensor 142 may recognize the movement of the mobile terminal 100 and may thus generate a gyro signal. Then, the controller 180 may detect the gyro signal generated by the gyro-sensor 142 and may display a webpage list including a plurality of webpages that have been visited by the user in the display region of the mobile terminal 100, as shown in FIG. 18(b). If the user maintains the mobile terminal 100 to be tilted to the right, the controller 180 may control the webpage list 229 to be scrolled through.

When a desired webpage item 'JOEPARK.COM' is encountered while scrolling through the webpage list 229, the user may input a command to access a webpage corresponding to the desired webpage item 'JOEPARK.COM' to the mobile terminal 100.

More specifically, the user may input a command to access the webpage corresponding to the desired webpage item 'JOEPARK.COM' to the mobile terminal 100 in various manners. For example, referring to FIG. 18(*b*), when the desired webpage item 'JOEPARK.COM' is encountered while scrolling through the webpage list 229, the user may input a command to access the webpage corresponding to the desired webpage item 'JOEPARK.COM' by tilting the mobile terminal 100 to the left, touching the desired webpage item 'JOEPARK.COM' or manipulating a hard key or a soft key for issuing a command to access the desired webpage item 'JOEPARK.COM' when the desired webpage item 'JOEPARK.COM' is highlighted.

Figure 18:
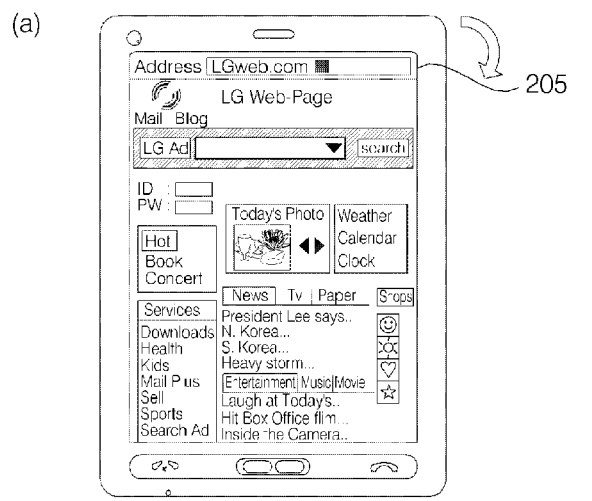
FIG. 18 illustrates diagrams for explaining how to change a webpage in response to a gyro signal generated when an address window included in the webpage is pointed at by a cursor.
Figure 18:
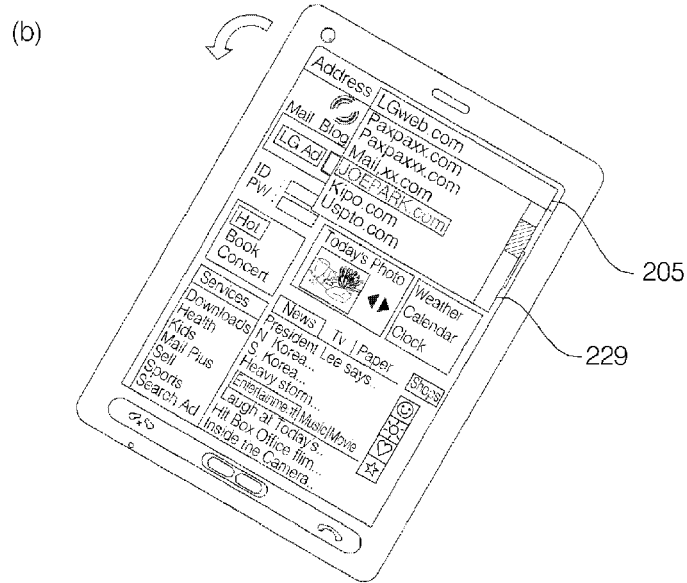
Figure 18:
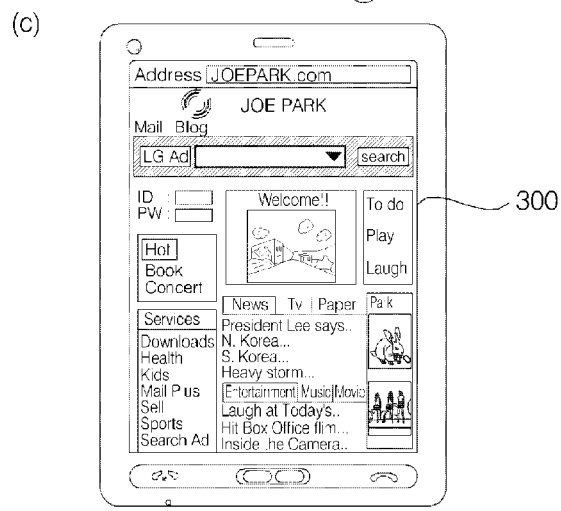

Referring to FIG. 18(*c*), if a command to access the webpage corresponding to the desired webpage item 'JOEPARK.COM' is detected, the controller 180 may display a webpage 300 corresponding to the desired webpage item 'JOEPARK.COM' in the display region of the mobile terminal 100.

When the address window 205 is highlighted, the controller 180 may display a webpage list including webpages registered as Favorites. Thereafter, the controller 180 may control the webpage list to be scrolled through or may select one of the webpages included in the webpage list.

Figure 19:
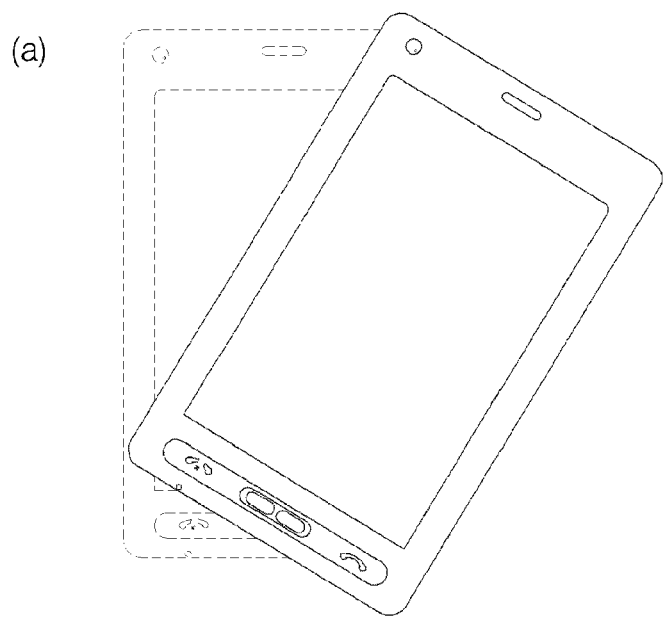
FIG. 19 illustrates diagrams for explaining how to display a popup window for providing instructions on how to enlarge and display or highlight a number of text-input areas included in a webpage in response to a tab/cursor move command.
Figure 19:
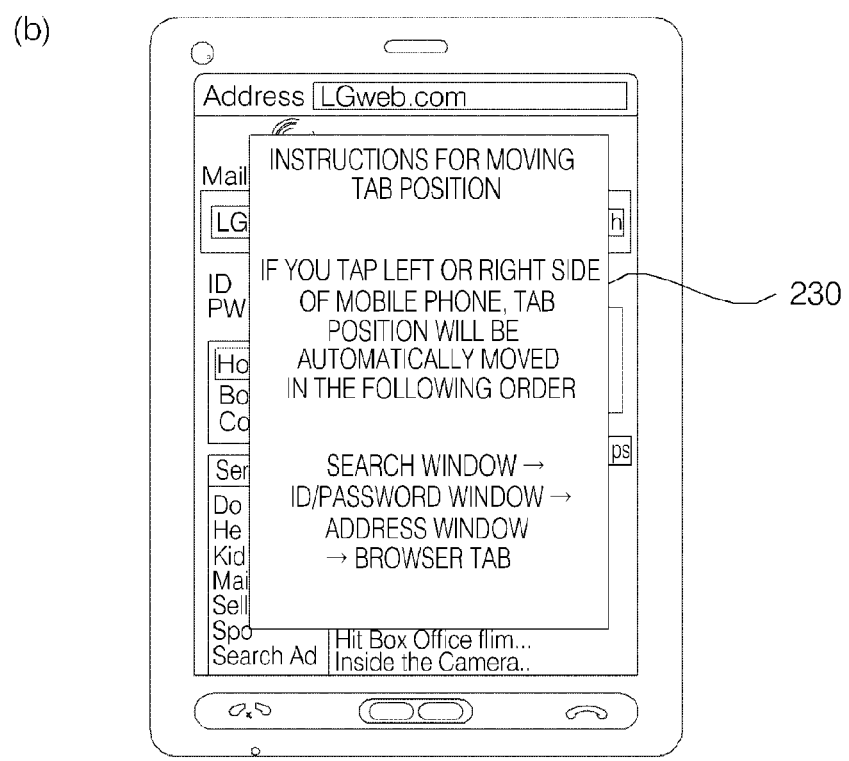

FIG. 19 illustrates diagrams for explaining how to display a popup window for providing instructions on how to enlarge and display or highlight a number of text-input areas included in a webpage in response to a tab/cursor move command. Referring to FIG. 19(*a*), if the mobile terminal 100 is moved, the gyro-sensor 142 may generate a gyro signal. Then, the controller 180 may determine that a tab/cursor move command has been input to the mobile terminal 100.

Thereafter, the controller 180 may display a popup window 230 for providing instructions on how to enlarge and display or highlight a number of text-input areas before displaying a webpage. Therefore, the user may be able to easily identify how to enlarge and display or highlight a number of text-input areas based on the popup window 230.

In this exemplary embodiment, a plurality of text-input areas included in a webpage may be sequentially enlarged and displayed or sequentially highlighted in response to a tab/cursor move command, but the present invention is not restricted to this. That is, various parts of a webpage other than text-input areas may be sequentially enlarged and displayed or sequentially highlighted in response to a tab/cursor move command.

For example, if a plurality of tabs respectively corresponding to a plurality of webpages are displayed in a web browser, the tabs may be sequentially enlarged and displayed or sequentially highlighted in response to a tab/cursor move command.

Alternatively, if a plurality of tabs respectively corresponding to a plurality of webpages are displayed in a web browser and each of the webpages includes a plurality of text-input areas, the tabs and the text-input areas of each of the webpages may be sequentially enlarged and displayed or sequentially highlighted in response to a tab/cursor move command. In this case, whenever enlarged and displayed or whenever highlighted, each of the text-input areas of each of the webpages may be pointed at by a cursor. In addition, whenever enlarged and displayed or whenever highlighted, each of the tabs may be activated so as to respond to an 'enter' command input by the user.

FIGS. 20 through 49 illustrate diagrams for explaining how to control the mobile terminal 100 in response to the movement of the mobile terminal 100. Referring FIGS. 20 through 49, the user may move the mobile terminal 100 in a predetermined manner. Then, the gyro-sensor 142 may generate a gyro signal corresponding to the moving direction and speed of the mobile terminal 100. The controller 180 may control the mobile terminal 100 in response to the gyro signal in consideration of a current operating mode of the mobile terminal 100 or the type of program currently being executed by the mobile terminal 100.

For example, if a webpage is displayed in the display region of the mobile terminal 100, the controller 180 may move the webpage in response to the gyro signal so that a text-input area included in the webpage can be displayed in a certain part of the display region of the mobile terminal 100 or can be enlarged. Alternatively, if a Korean keyboard is displayed in the display region of the mobile terminal 100, the controller 180 may replace the Korean keyboard with an English keyboard in response to the gyro signal. Still alternatively, if the user moves the mobile terminal 100 in a predetermined manner while typing a message on the mobile terminal 100, the controller 180 may display such text as commonly-used phrases in the display region of the mobile terminal 100 in response to the gyro signal.

Figure 20:
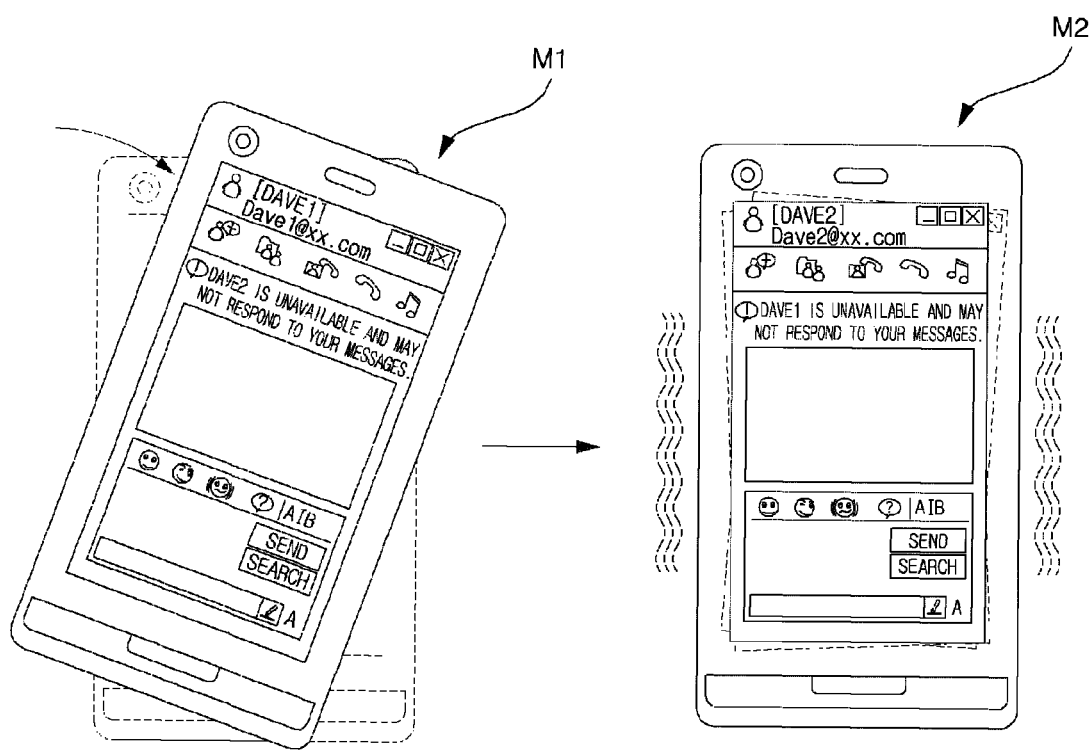
FIGS. 20 through 49 illustrate diagrams for explaining how to control the mobile terminal shown in FIG. 1 in response to the movement of the mobile terminal shown in FIG. 1.

FIG. 20 illustrates diagrams for explaining how to apply an effect to a messenger program in response to the movement of a mobile terminal. Referring to FIG. 20, if a mobile terminal M1 is tapped or shaken in the middle of using a messenger program loaded in the mobile terminal M1, a gyro-sensor of the mobile terminal M1 may recognize the movement of the mobile terminal M1 and may thus generate a gyro signal. The messenger program may be a personal computer (PC)-based messenger service, for example, an instance messenger program.

Then, the controller 180 may identify how the mobile terminal 100 has been moved based on the gyro signal, and may determine that a command to shake a chat window has been input.

Thereafter, the mobile terminal M1 may transmit a command to shake a chat window to a mobile terminal M2. If a messenger program loaded in the mobile terminal M2 supports a function of shaking a chat room, the mobile terminal M2 may shake.

Figure 21:
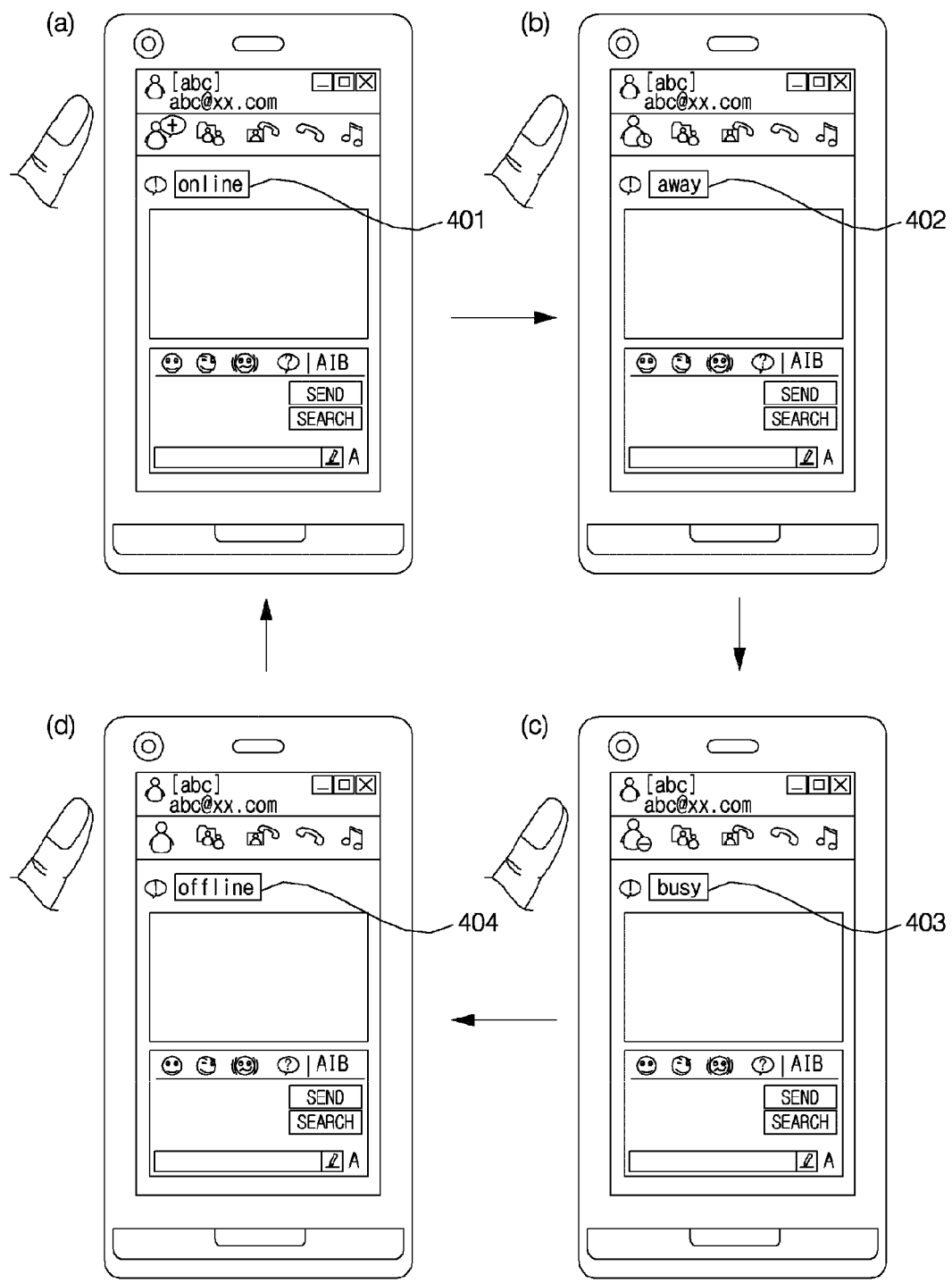

FIG. 21 illustrates diagrams for explaining how to change the state of use of a messenger program in response to the movement of the mobile terminal 100. Referring to FIG. 21, if the user taps the mobile terminal 100 when using a messenger program loaded in the mobile terminal 100, the gyro-sensor 142 may recognize the movement of the mobile terminal 100 and may thus generate a gyro signal. The controller 180 may determine that a command to change the state of use of the messenger program has been input based on the gyro signal. The state of use of the messenger program may indicate how the user is currently using the messenger program. The state of use of the messenger program may be classified into an 'online' state, an 'offline' state, an 'away' state, or a 'busy' state.

Referring to FIG. 21(*a*), if the user taps the mobile terminal 100 once when the state of use of the messenger program is the 'online' state 401, the controller 180 may switch the messenger program to the 'away' state 402. Thereafter, if the user taps the mobile terminal 100 once again, the controller 180 may switch the messenger program from the 'away' state to the 'busy' state 403. Thereafter, if the user taps the mobile terminal 100 once again, the controller 180 may switch the messenger program from the 'busy' state to the 'offline' state 404. Thereafter, if the user taps the mobile terminal 100 once again, the controller 180 may switch the messenger program from the 'offline' state to the 'online' state.

Figure 22:
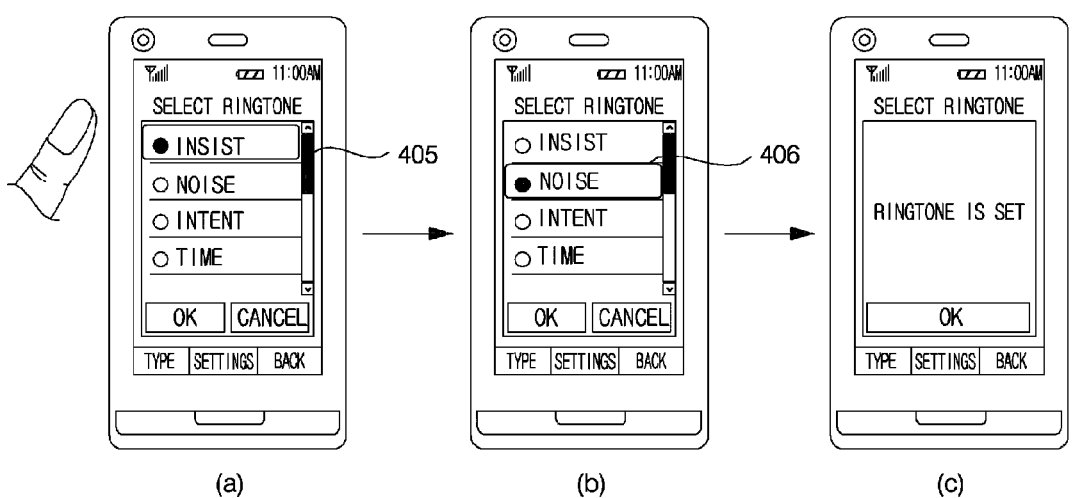

FIG. 22 illustrates diagrams for explaining how to change the ringtone of the mobile terminal 100 in response to the movement of the mobile terminal 100 when a ringtone list is displayed in the display region of the mobile terminal 100. Referring to FIG. 22, if the user issues a command to select a ringtone, the mobile terminal 100 may be placed in a ringtone list view mode.

Thereafter, referring to FIG. 22(*a*), if the user taps one side of the mobile terminal 100 when one of a plurality of ringtones included in a ringtone list 405 is highlighted, the gyro-sensor 142 may recognize the movement of the mobile terminal 100 and may thus generate a gyro signal. Then, the controller 180 may determine that a command to change the ringtone of the mobile terminal 100 has been input based on the gyro signal.

Thereafter, referring to FIG. 22(*b*), the controller 180 may select a ringtone 406 directly below the ringtone currently being highlighted. Then, the ringtone of the mobile terminal 100 may be changed to the selected ringtone after the lapse of a predefined amount of time, as in FIG. 22(*c*).

On the other hand, if the user taps another side of the mobile terminal 100, the controller 180 may select a ringtone directly above the ringtone currently being highlighted, instead of the ringtone directly below the ringtone currently being highlighted. The selection of one of the ringtones in the ringtone list in response to the tapping of the mobile terminal 100 may be applied to various list view modes other than the ringtone list view mode. For example, the user may select one of a plurality of photos in a photo list or one of a plurality of messages in a message list simply by tapping the mobile terminal 100.

Figure 23:
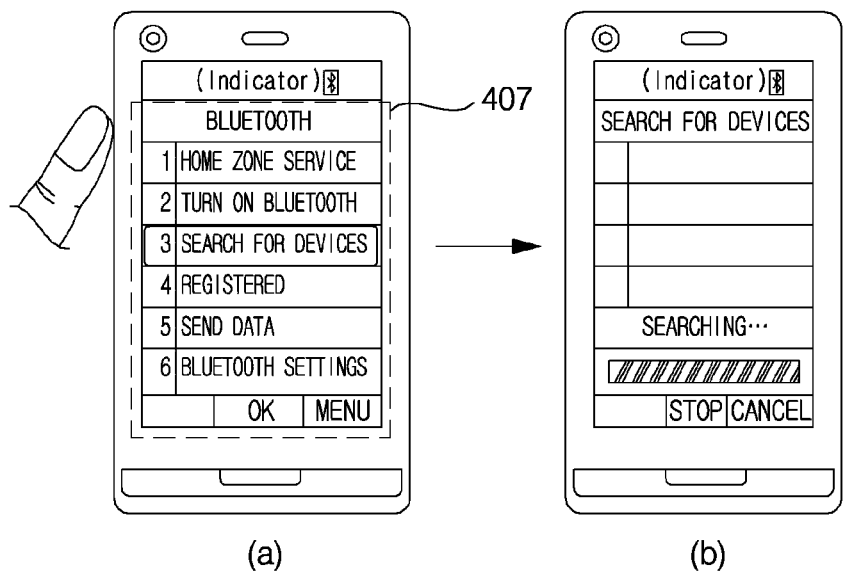
Figure 24:
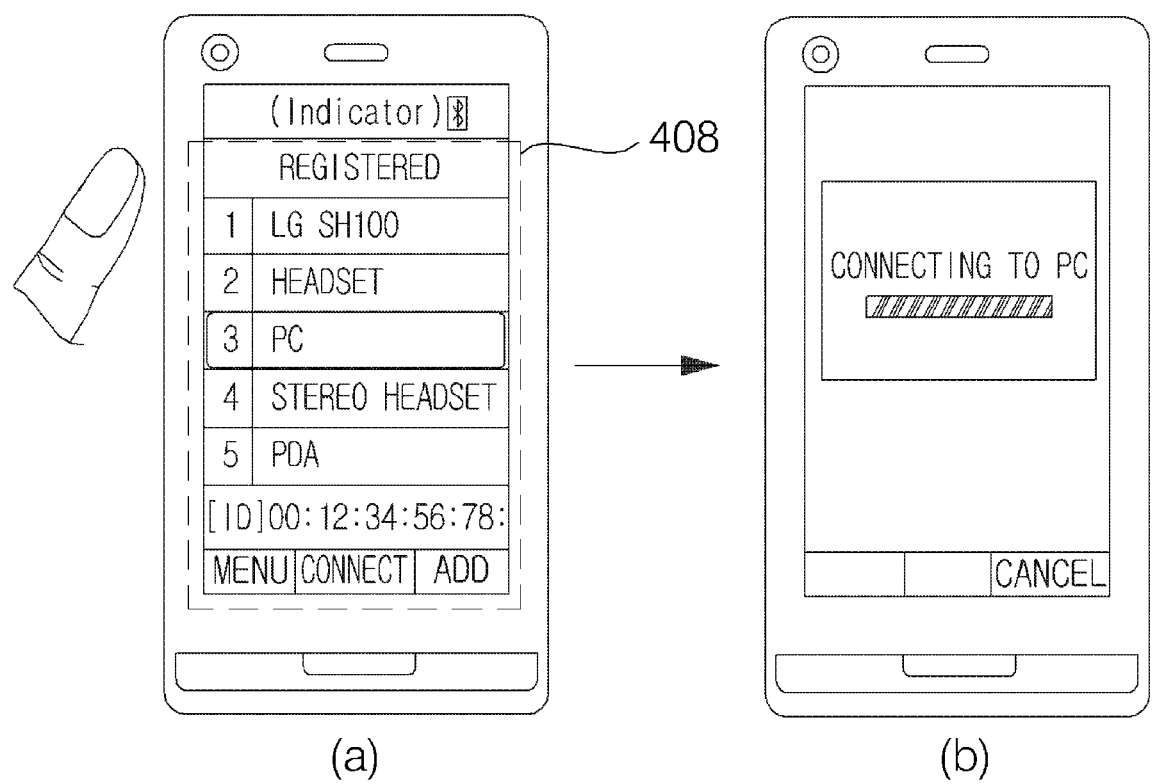

FIGS. 23 and 24 illustrate diagrams for explaining how to connect the mobile terminal 100 to an external device via Bluetooth communication, which is a type of short-range data communication. Referring to FIG. 23, if the mobile terminal 100 is moved in a predefined manner, the controller 180 may search for one or more external devices that can be connected to the mobile terminal 100 via Bluetooth communication.

More specifically, referring to FIG. 23(*a*), if the user taps the mobile terminal 100 when a Bluetooth menu 407 is displayed in the display region of the mobile terminal 100 and when a '3.Search for Devices' item from the menu 407 is highlighted, the gyro-sensor 142 may recognize the movement of the mobile terminal 100 and may thus generate a gyro signal. Then, the controller 180 may determine that a command to search for one or more Bluetooth devices within a short range of the mobile terminal 100 has been input based on the gyro signal. Thereafter, referring to FIG. 23(*b*), the controller 180 may search for one or more external devices that can be connected to the mobile terminal 100 via Bluetooth communication.

Thereafter, referring to FIG. 24(*a*), the controller 180 may display a registered device list 408, which is an external device list including a plurality of external devices that can be connected to the mobile terminal 100 via Bluetooth communication in the display region of the mobile terminal 100. Then, the user may select one of the external devices by tapping the mobile terminal 100. More specifically, if the user taps the left side of the mobile terminal 100 when one of the external devices is highlighted, an external device directly below the external device currently being highlighted may be selected. On the other hand, if the user taps the right side of the mobile terminal 100 when one of the external devices is highlighted, an external device directly above the external device currently being highlighted may be selected.

For example, referring to FIG. 24(*a*), if a predefined amount of time elapses after the selection of an external device '3. PC' from the external device list the controller 180 may connect the mobile terminal 100 to the external device '3. PC' via Bluetooth connection as is FIG. 24(*b*). In this exemplary embodiment, the user may search for one or more external devices that can be connected to the mobile terminal 100 via Bluetooth connection and select one of the external devices by tapping the mobile terminal 100 or moving the mobile terminal 100 in other various manners. Even when the mobile terminal 100 is in a standby mode, the user may still be able to search for one or more external devices that can be connected to the mobile terminal 100 via Bluetooth connection and select one of the external devices by moving the mobile terminal 100 in a predefined manner. The mobile terminal 100 may be connected to an external device using various short-range communication methods other than Bluetooth.

Figure 25:
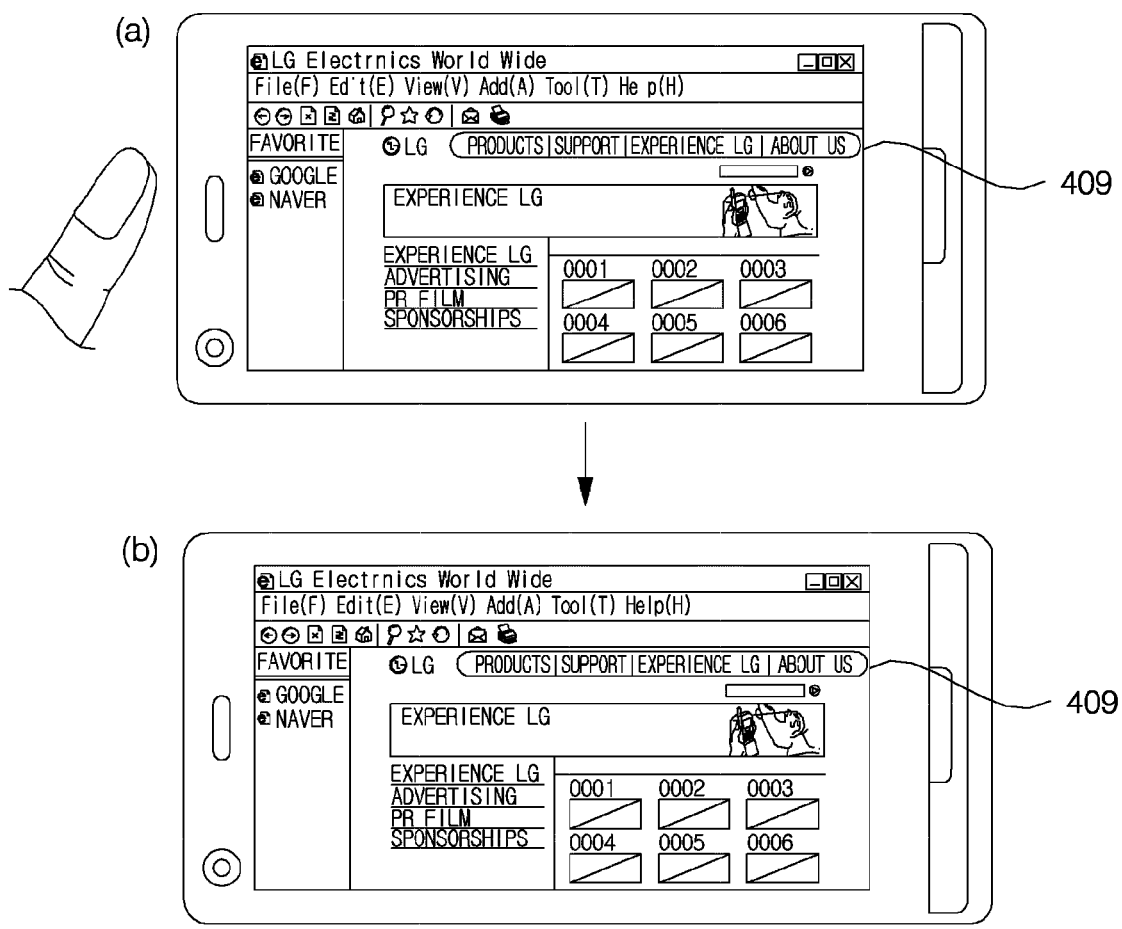

FIGS. 25 through 28 illustrate diagrams for explaining how to perform a predetermined operation on a webpage in response to the movement of the mobile terminal 100 when a web browser is loaded in the mobile terminal 100. Referring to FIG. 25(*a*), if the user taps the mobile terminal 100 when a webpage 409 is displayed in the display region of the mobile terminal 100, the controller 180 may determine that a command to refresh the webpage 409 has been input. Thus, referring to FIG. 25(*b*), the controller 180 may refresh the webpage 409.

Figure 26:
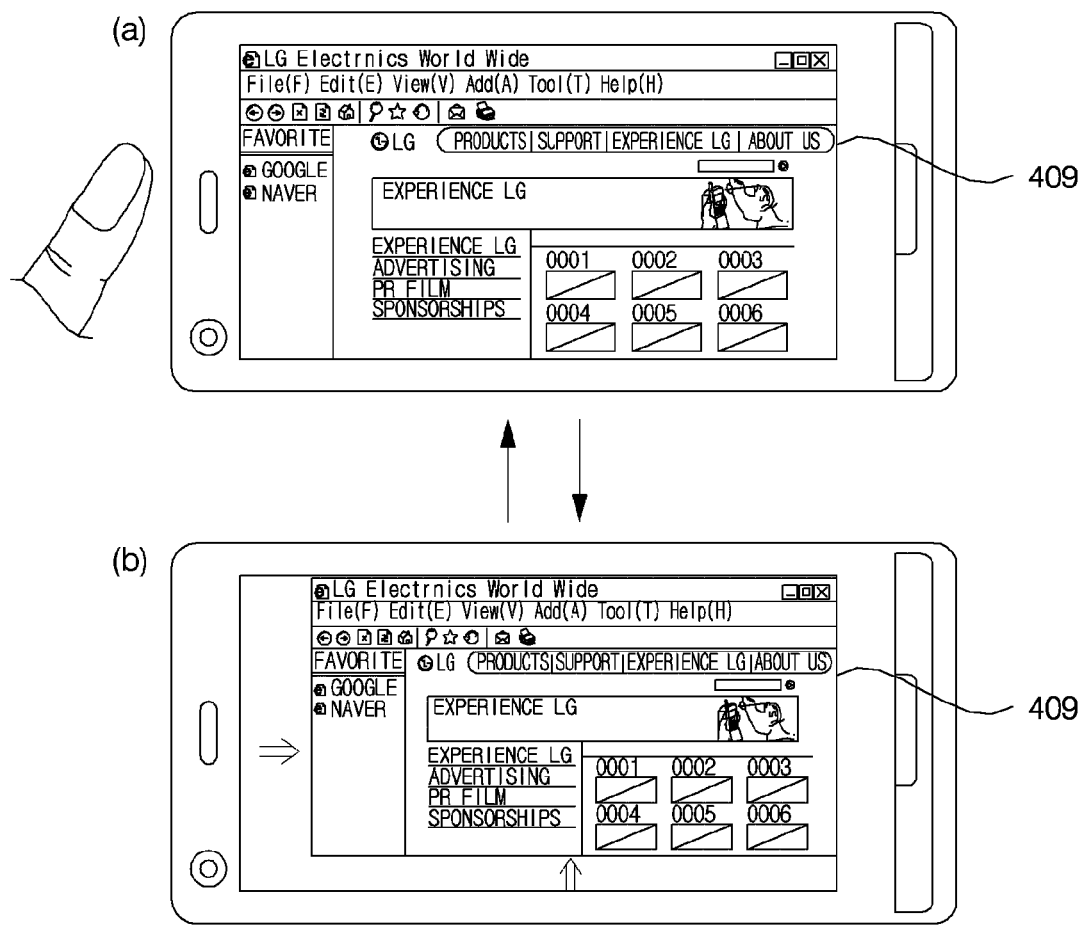

Referring to FIG. 26(*a*), if the user taps the left side of the mobile terminal 100 when a webpage 409 is displayed in the display region of the mobile terminal 100, the controller 180 may determine that a command to scale down the webpage has been input, and may thus scale down the webpage 409 as in FIG. 26(*b*). On the other hand, referring to FIG. 26(*b*), if the user taps the right side of the mobile terminal 100 when a webpage 409 is displayed in the display region of the mobile terminal 100, the controller 180 may determine that a command to scale up the webpage has been input, and may thus scale up the webpage 409.

Figure 27:
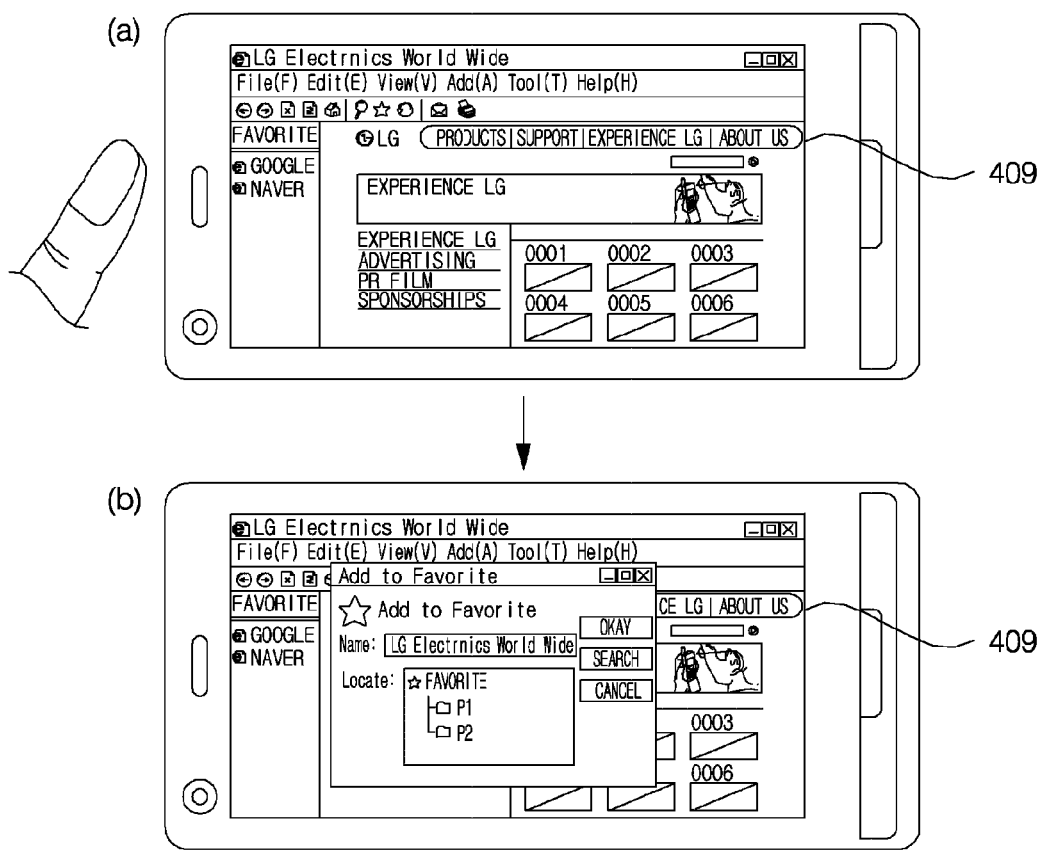

Referring to FIG. 27(*a*), if the user taps the mobile terminal 100 when a webpage 409 is displayed in the display region of the mobile terminal 100, the controller 180 may determine that a command to add the webpage as a Favorite has been input. Thus, referring to FIG. 27(*b*), the controller may add the webpage 409 as a favorite.

Figure 28:
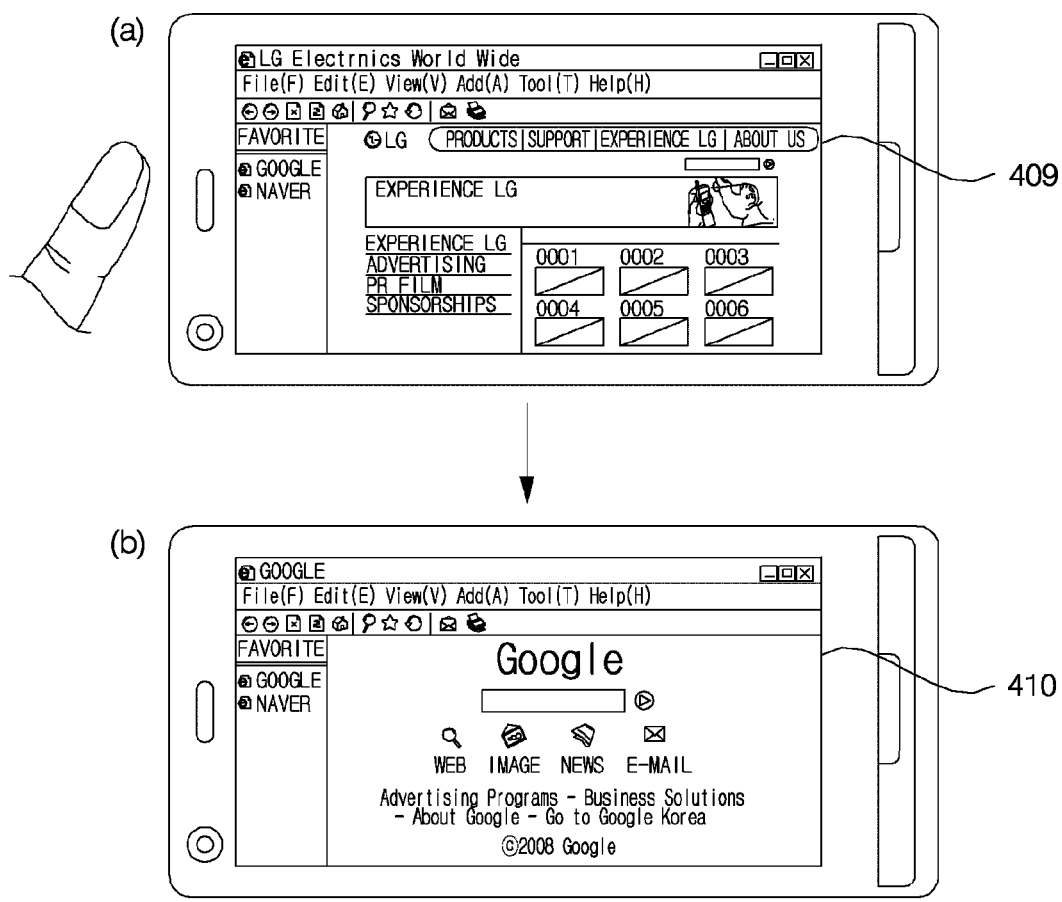

Referring to FIG. 28(*a*), if the user taps the mobile terminal 100 when a webpage 409 is displayed in the display region of the mobile terminal 100, the controller 180 may determine that a command to display previous webpage 410 to be displayed on the display region has been input. Thus, referring to FIG. 28(*b*), the controller may display previous displayed webpage 410 on the display region.

In short, the controller 180 may perform various operations such as refreshing a webpage, scaling up or down a webpage, adding a webpage as a Favorite and navigating to a previous or next webpage according to the pattern of movement of the mobile terminal 100.

Figure 29:
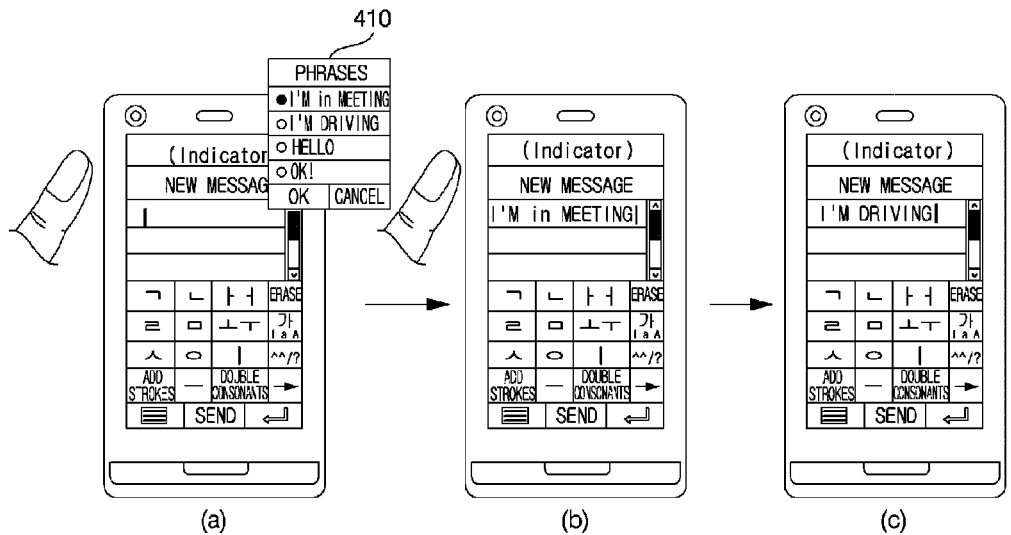

FIG. 29 illustrates diagrams for explaining how to select one of a plurality of listed commonly-used phrases in response to the movement of the mobile terminal 100 during a 'send message' mode. Referring to FIG. 29(*a*), if the user taps the mobile terminal 100 in the 'send message' mode, the controller 180 may determine that a command to insert a commonly-used phrase in a current text message has been input and may display a list of commonly-used phrases, which is list 410 in FIG. 29(*a*). More specifically, if the user taps the mobile terminal 100 once, the controller 180 may determine that a command to insert a first phrase from the top of the list, i.e., 'I'm in a meeting,' in the current text message has been input, and may thus insert the first phrase from the top of the list in the displayed list 410 in the current text message, as shown in FIG. 29(*b*). On the other hand, if the user taps the mobile terminal 100 twice, the controller 180 may determine that a command to insert a second phrase from the top of the list 410, i.e., 'I'm driving,' in the current text message has been input, and may thus insert the second phrase from the top of the list in the current text message, as shown in FIG. 29(*c*). The insertion of the first or second phrase from the top of the list in the current text message may be finalized after the lapse of a predefined amount of time or when a character key for inputting a character is input.

Alternatively, if the user moves the mobile terminal 100 in a predefined manner when the mobile terminal 100 is placed in a 'check received messages' mode or rings, the controller 180 may also select one of a plurality of commonly-used phrases and may respond to the sender of a message currently being checked or the caller using the selected commonly-used phrase.

Figure 30:
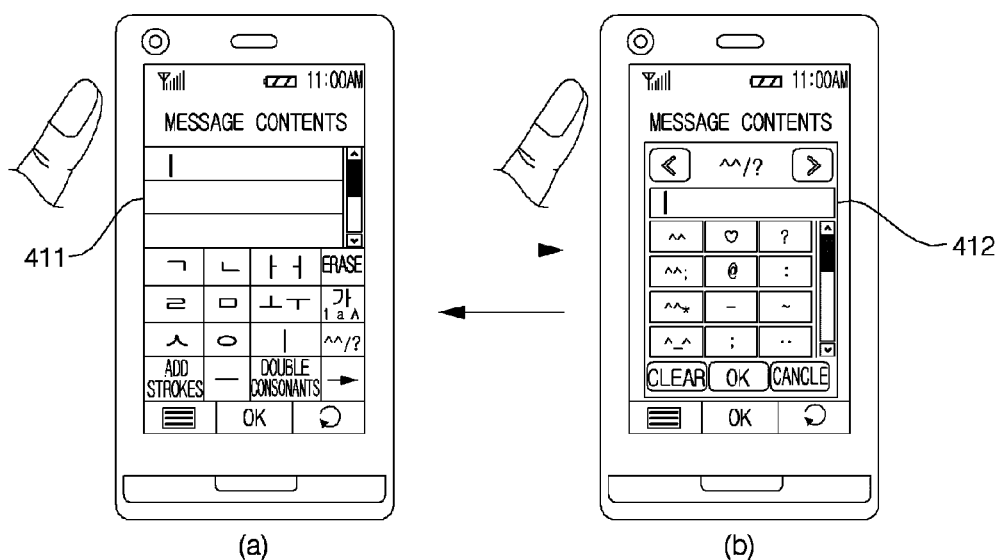
Figure 31:
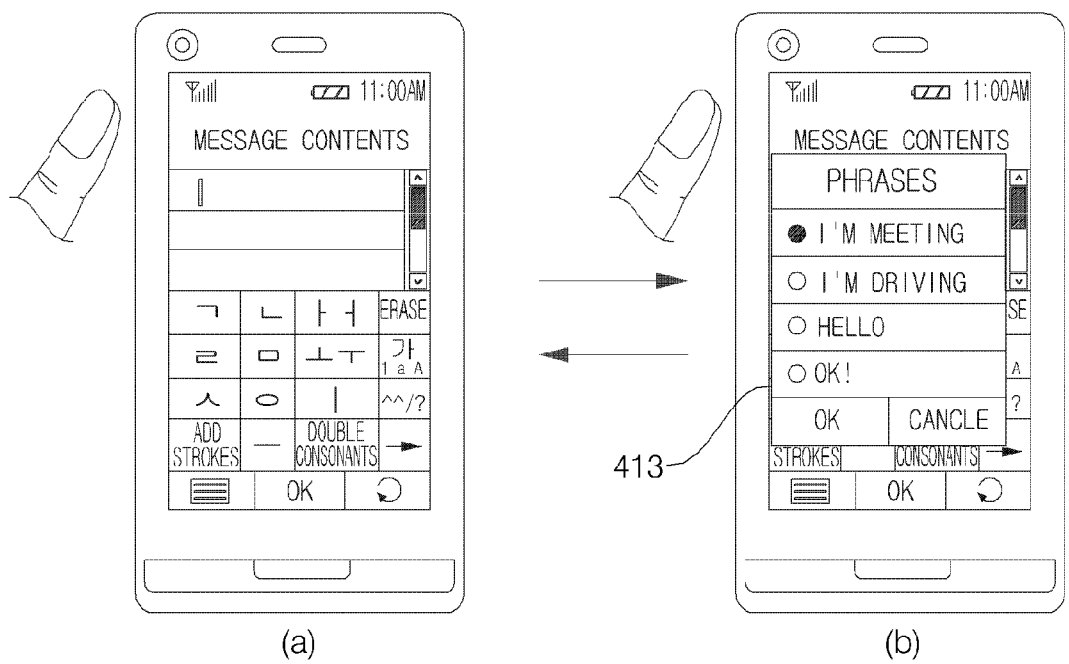

FIGS. 30 and 31 illustrate diagrams for explaining how to change a message input mode in response to the movement of the mobile terminal 100. Referring to FIG. 30(*a*), if the user taps the mobile terminal 100 when typing a message into a message input window 411 on the mobile terminal 100 using a keypad mode, the controller 180 may determine that a command to switch to an emoticon-input mode has been input. Thus, referring to FIG. 30(*b*), the controller may display an emoticon-input window 412 in the display region of the mobile terminal 100. Thereafter, if the user taps the mobile terminal 100 once again, the mobile terminal 100 may be switched back to the keypad mode.

Alternatively, referring to FIG. 31(*a*), if the user taps the mobile terminal 100 when typing a message on the mobile terminal 100 in the keypad mode, the controller 180 may determine that a command to switch to a commonly-used-phrase-input mode has been input. Thus, referring to FIG. 31(*b*), the controller may display a commonly-used-phrase-input window 413 in the display region of the mobile terminal 100. Thereafter, if the user taps the mobile terminal 100 once again, the mobile terminal 100 may be switched back to the keypad mode.

Figure 32:
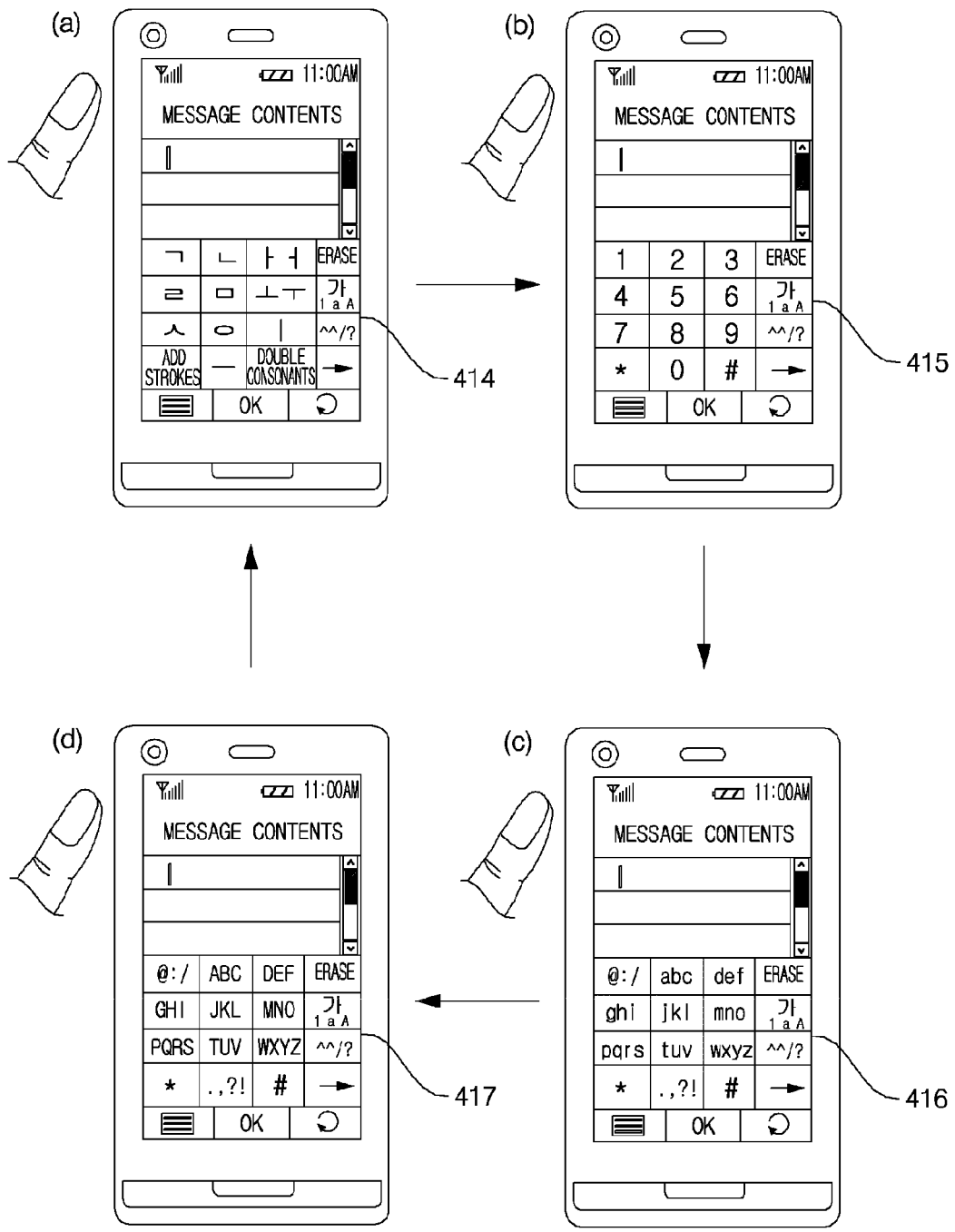
Figure 33:
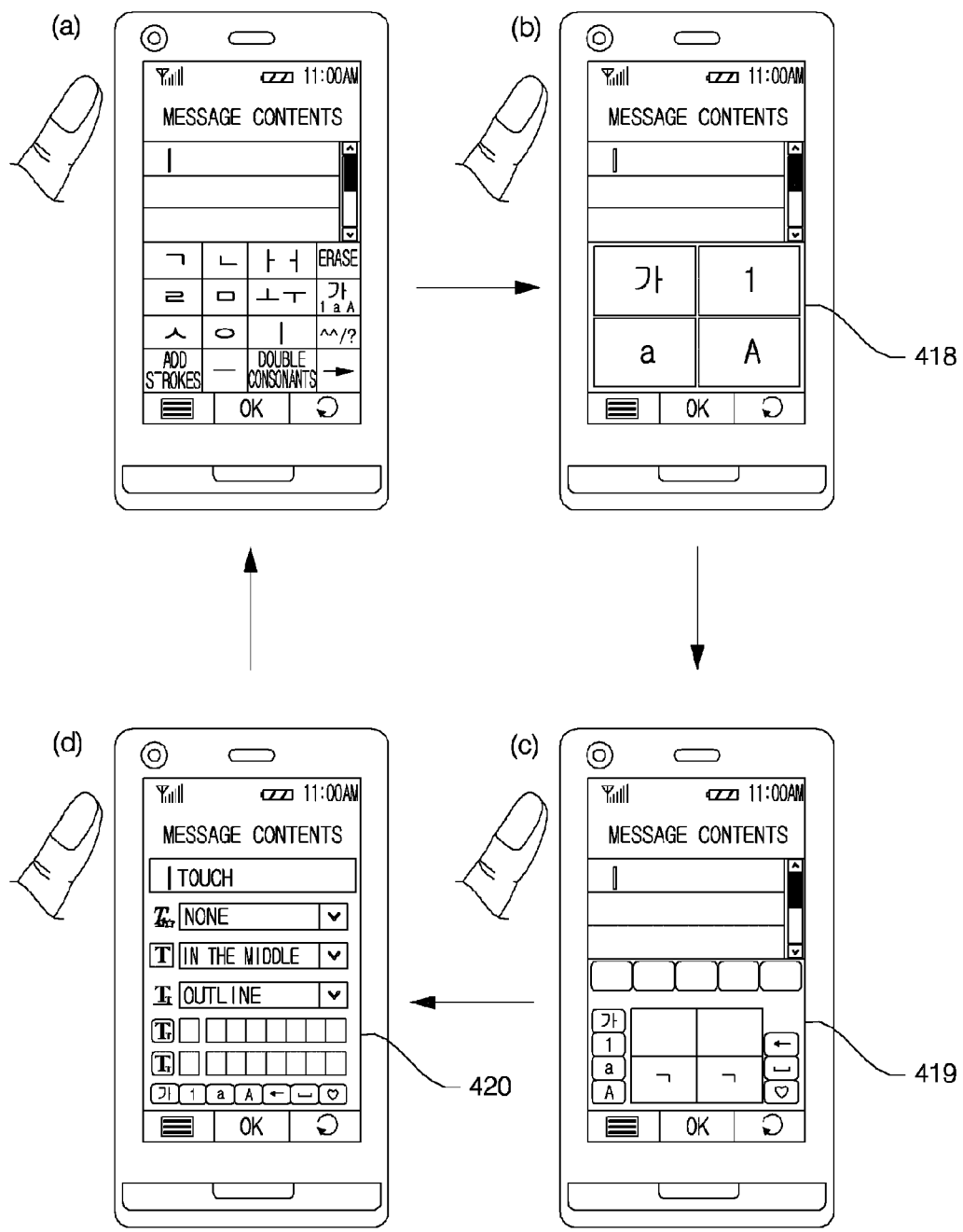

FIGS. 32 and 33 illustrate diagrams for explaining how to switch between various types of keyboards in response to the movement of the mobile terminal 100 during a text-input mode such as a mode for writing a message. Referring to FIGS. 32(*a*) and 32(*b*), if the user taps the mobile terminal 100 when a default keyboard 414, i.e., a Korean keyboard, is displayed in the display region of the mobile terminal 100, the controller 180 may display a number keyboard 415 in the display region of the mobile terminal 100. Thereafter, if the user taps the mobile terminal 100 again, the controller 180 may display an English small letter keyboard 416 in the display region of the mobile terminal 100, as shown in FIG. 32(*c*). Thereafter, if the user taps the mobile terminal 100 again, the controller 180 may display an English capital letter keyboard 417 in the display region of the mobile terminal 100, as shown in FIG. 32(*d*). Thereafter, if the user taps the mobile terminal 100 again, the controller 180 may display the Korean keyboard 414 back in the display region of the mobile terminal 100.

Referring to FIGS. 33(*a*) and 33(*b*), if the user taps the mobile terminal 100 during a keypad mode, the controller 180 may switch the mobile terminal 100 to a box handwriting (cursive) mode, and may display a screen 418 corresponding to the box handwriting (cursive) mode. Thereafter, if the user taps the mobile terminal 100 again, the controller 180 may switch the mobile terminal 100 to a box continuous handwriting (cursive) mode, and may display a screen 419 corresponding to the box continuous handwriting (cursive) mode, as shown in FIG. 33(*c*). Thereafter, if the user taps the mobile terminal 100 again, the controller 180 may switch the mobile terminal 100 to a screen input (cursive) mode, and may display a screen 420 corresponding to the screen input (cursive) mode, as shown in FIG. 33(*d*). Thereafter, if the user taps the mobile terminal 100 again, the controller 180 may switch the mobile terminal 100 back to the keypad mode.

Referring to FIGS. 32 and 33, the mobile terminal 100 may be automatically switched from one keyboard mode to another keyboard mode or from one character-input mode to another character-input mode whenever tapped by the user. In addition, if the user taps the mobile terminal 100 after the input of a small letter, the controller 180 may convert the small letter into a capital letter. The mobile terminal 100 may also be automatically switched from one keyboard mode to another keyboard mode or from one character-input mode to another character-input mode by being moved by the user, other than being tapped.

Figure 34:
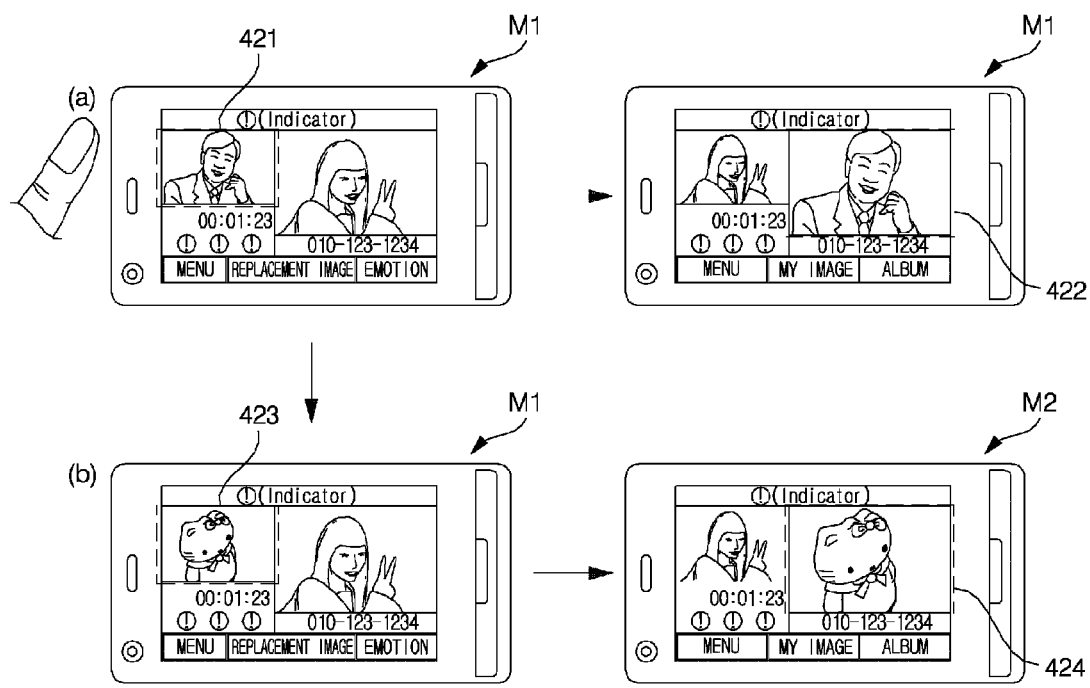
Figure 35:
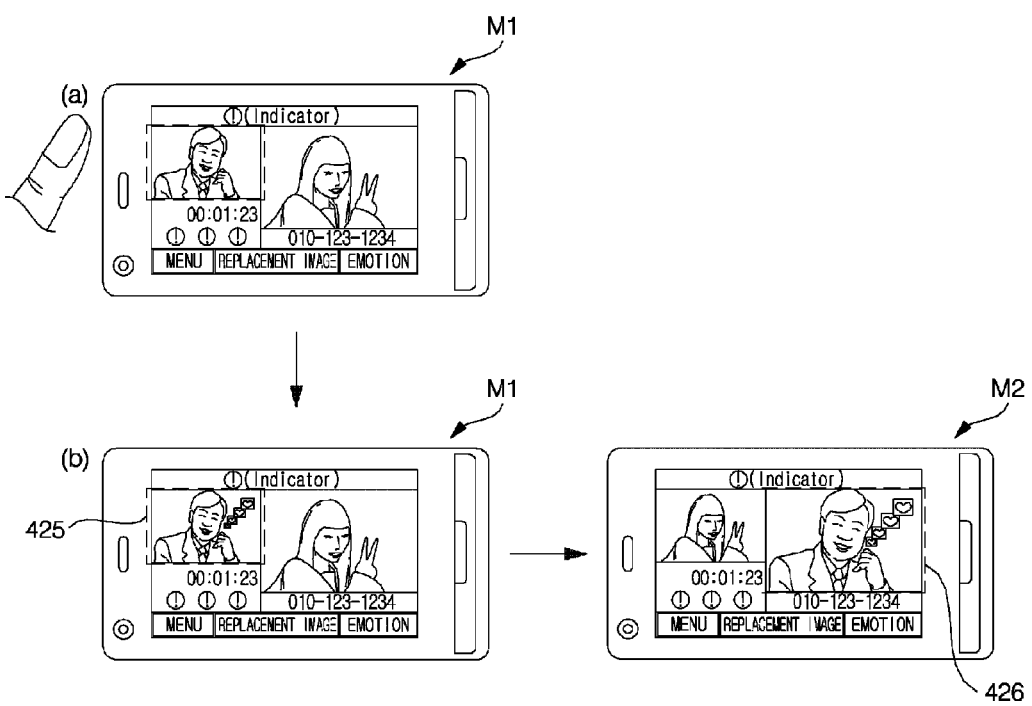

FIGS. 34 and 35 illustrate diagrams for explaining how to change a screen frame to be sent during a video call in response to the movement of the mobile terminal 100 in a video-call mode. Referring to FIG. 34(*a*), during a video call between a mobile terminal M1 and a mobile terminal M2, the image of a user of the mobile terminal M1 may be displayed in a window 421 of the mobile terminal M1 and a window 422 of the mobile terminal M2, respectively. In this case, if the user of the mobile terminal M1 taps the mobile terminal M1, the mobile terminal M1 may determine that a command to send a replacement image has been input. Therefore, the mobile terminal M1 may send a replacement image, instead of the image of the user of the mobile terminal M1, to the mobile terminal M2. Referring to FIG. 34(*b*), the replacement image sent by the mobile terminal M1 may be displayed in a window 423 of the mobile terminal M1 and a window 424 of the mobile terminal M2, respectively.

The replacement image sent by the mobile terminal M1 may be an image selected in advance by the user of the mobile terminal M1 or a default image. In addition, the replacement image sent by the mobile terminal M1 may be a still or moving image. Moreover, the replacement image sent by the mobile terminal M1 may include icons, emoticons or aniticons. Referring to FIG. 35, a moving image obtained by synthesizing the image of the user of the mobile terminal and emoticons may be used as a replacement image. More specifically, if the user of the mobile terminal M1 taps the mobile terminal, as shown in FIG. 35(*a*), the mobile terminal M1 may display a moving image obtained by synthesizing the image of the user of the mobile terminal and emoticons in a window 425 as a replacement image, as shown in FIG. 35(*b*). Thereafter, the mobile terminal M1 may send the replacement image to the mobile terminal M2. Then, the mobile terminal M2 may display the replacement image sent by the mobile terminal M1 in a window 426, as shown in FIG. 35(*b*). An intentionally-distorted image obtained by applying a mirror effect or a concave-lens effect to the image of the user of the mobile terminal M1 may also be used as a replacement image.

Figure 36:
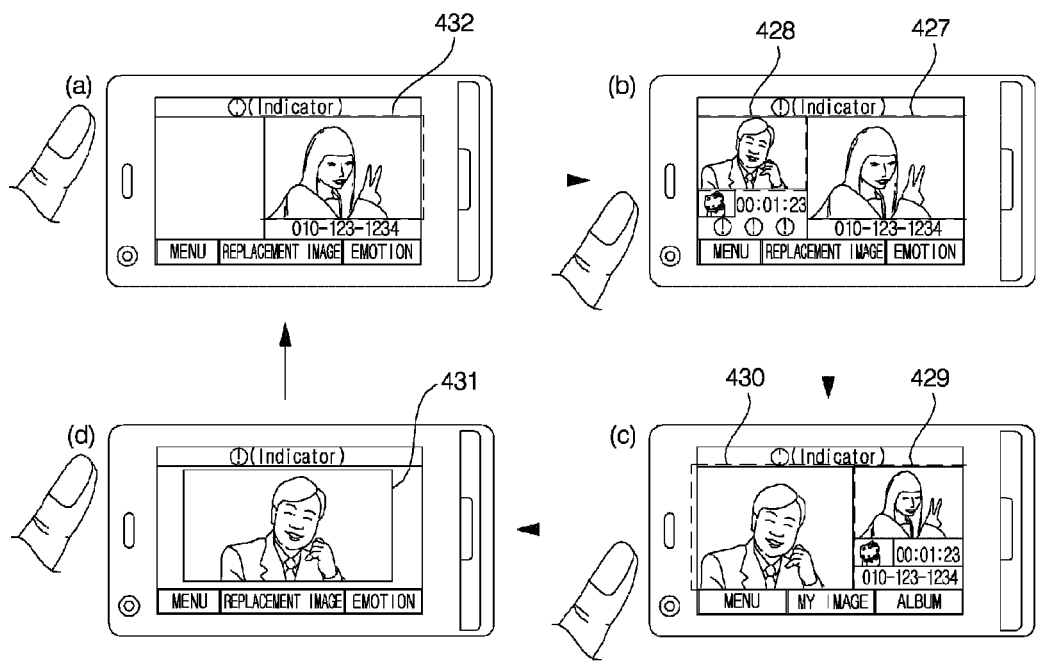

FIG. 36 illustrates diagrams for explaining how to change the moving-image-view mode of the mobile terminal 100 in response to the movement of the mobile terminal 100 during a video-call mode. Referring to FIG. 36, if the user taps the mobile terminal 100 during the video-call mode, the controller 180 may determine that a command to change the moving-image-view mode of the mobile terminal 100 has been input, and may thus change the moving-image-view mode of the mobile terminal 100. More specifically, the moving-image-view mode of the mobile terminal 100 may be automatically changed from a 'display the other party's image in full view' mode, which is a mode displaying the other party's image in window 427 and my image in window 428 as in to FIG. 36(b), to a 'display the other party's image in compact view' mode, which is a mode displaying the other party's image in window 429 and my image in window 430 as in FIG. 36(c). Also, the moving-image-view mode of the mobile terminal 100 may be automatically changed from the 'view the other party's image in compact view' mode, as in FIG. 36(c), to a 'display my image only' mode', which is a mode displaying my image in window 431 as in FIG. 36(d). Also, the moving-image-view mode of the mobile terminal 100 may be automatically changed from the 'display my image only' mode, as in FIG. 36(d) to a 'display the other party's image only' mode, which is a mode displaying the other party's image in window 432 as in FIG. 36(a).

Figure 37:
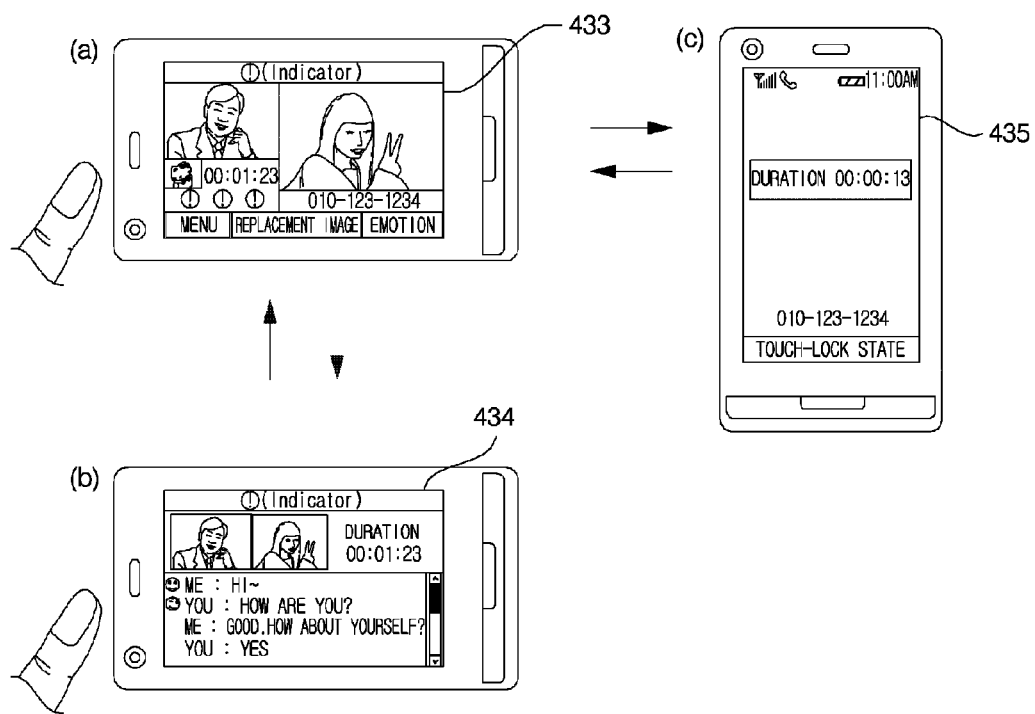

FIG. 37 illustrates diagrams for explaining how to switch the mobile terminal 100 from a video-call mode to a voice-call mode or a chat mode in response to the movement of the mobile terminal 100. Referring to FIG. 37(a), in which screen 433 for video-call mode is displayed, if the user taps the mobile terminal 100 during the video-call mode, the controller 180 may determine that a command to switch the mobile terminal 100 to the chat mode has been input. Thus, referring to FIG. 37(b), in which screen 434 for chat mode is displayed, the controller 180 may switch the mobile terminal 100 to the chat mode. Thereafter, if the user taps the mobile terminal 100 again, the controller 180 may switch the mobile terminal 100 back to the video-call mode.

Alternatively, if the user taps the mobile terminal 100 during the video-call mode, as shown in FIG. 37(a), the controller 180 may determine that a command to switch the mobile terminal 100 to the voice-call mode has been input, and may thus switch the mobile terminal 100 to the voice-call mode as shown in FIG. 37(c), in which screen 435 for voice-call mode is displayed. Thereafter, if the user taps the mobile terminal 100 again, the controller 180 may switch the mobile terminal 100 back to the video-call mode.

Still alternatively, the controller 180 may set the switching of the mobile terminal 100 from the video-call mode to the chat mode and the switching of the mobile terminal 100 from the video-call mode to the voice-call mode to be performed in response to different patterns of movement of the mobile terminal 100.

Figure 38:
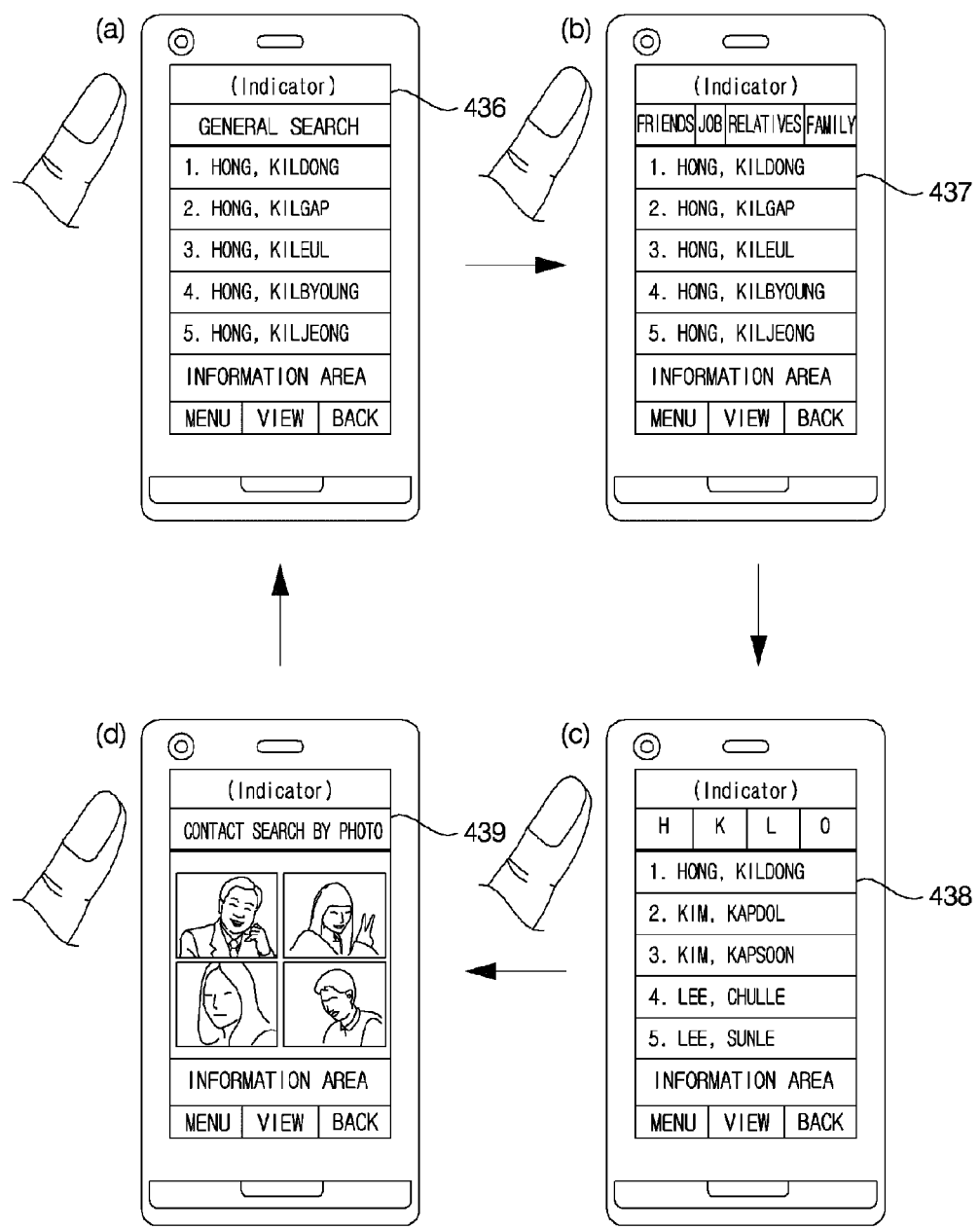

FIG. 38 illustrates diagrams for explaining how to change the phonebook search mode of the mobile terminal 100 in response to the movement of the mobile terminal 100. Referring to FIG. 38(a), if the user taps the mobile terminal 100 when a general phonebook search menu 436 is displayed in the display region of the mobile terminal 100, the controller 180 may determine that a command to enter a group-based phonebook search menu has been input. Thus, the controller 180 may display the group-based phonebook search menu 437 in the display region of the mobile terminal 100, as shown in FIG. 38(b). Thereafter, if the user taps the mobile terminal 100 again, the controller 180 may determine that a command to enter a consonant-based phonebook search menu has been input, and may thus display the consonant-by-consonant phonebook search menu 438 in the display region of the mobile terminal 100, as shown in FIG. 38(c). Thereafter, if the user taps the mobile terminal 100 again, the controller 180 may determine that a command to enter a photo-based phonebook search menu has been input, and may thus display the photo-based phonebook search menu 439 in the display region, as shown in FIG. 38(d). Thereafter, if the user taps the mobile terminal 100 again, the controller 180 may display the general phonebook search menu 436 back in the display region of the mobile terminal 100.

Figure 39:
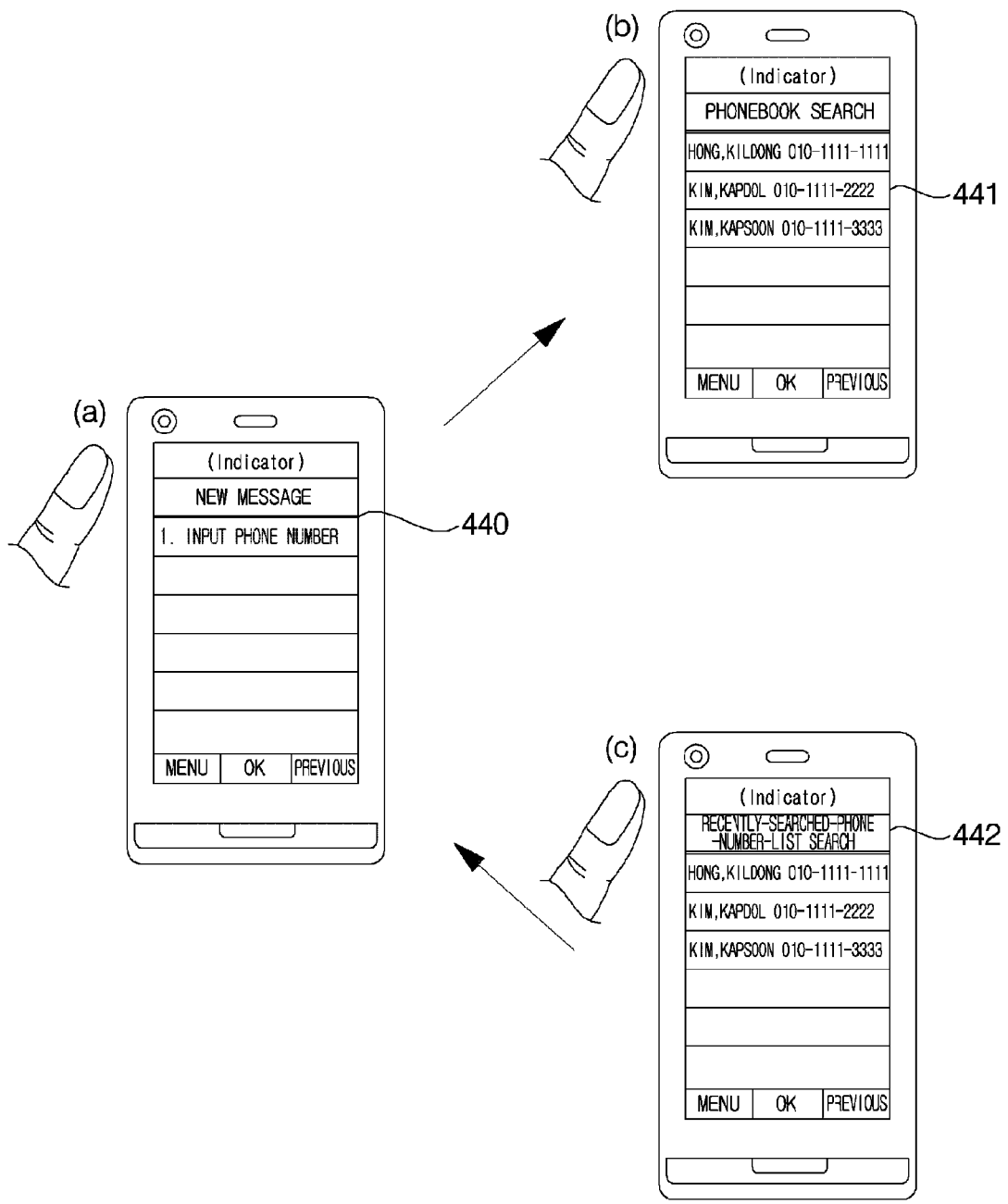

FIG. 39 illustrates diagrams for explaining how to change the phone-number-input mode of the mobile terminal 100 in response to the movement of the mobile terminal 100. Referring to FIG. 39(a), if the user taps the mobile terminal 100 when a phone-number-input screen 440 for inputting a desired phone number to which a message is to be sent is displayed in the display region of the mobile terminal 100, the controller 180 may determine that a command to change the phone-number-input mode of the mobile terminal 100 has been input. Thus, referring to FIG. 39(b), the controller 180 may display a phonebook search screen 441 for searching a phonebook for the desired phone number in the display region of the mobile terminal 100. Thereafter, if the user taps the mobile terminal 100 again, the controller 180 may determine that the command to change the phone-number-input mode of the mobile terminal 100 has been input again. Thus, referring to FIG. 39(c), the controller 180 may display a phonebook search menu 442 for searching a list of recently-searched phone numbers for the desired phone number in the display region of the mobile terminal 100.

Figure 40:
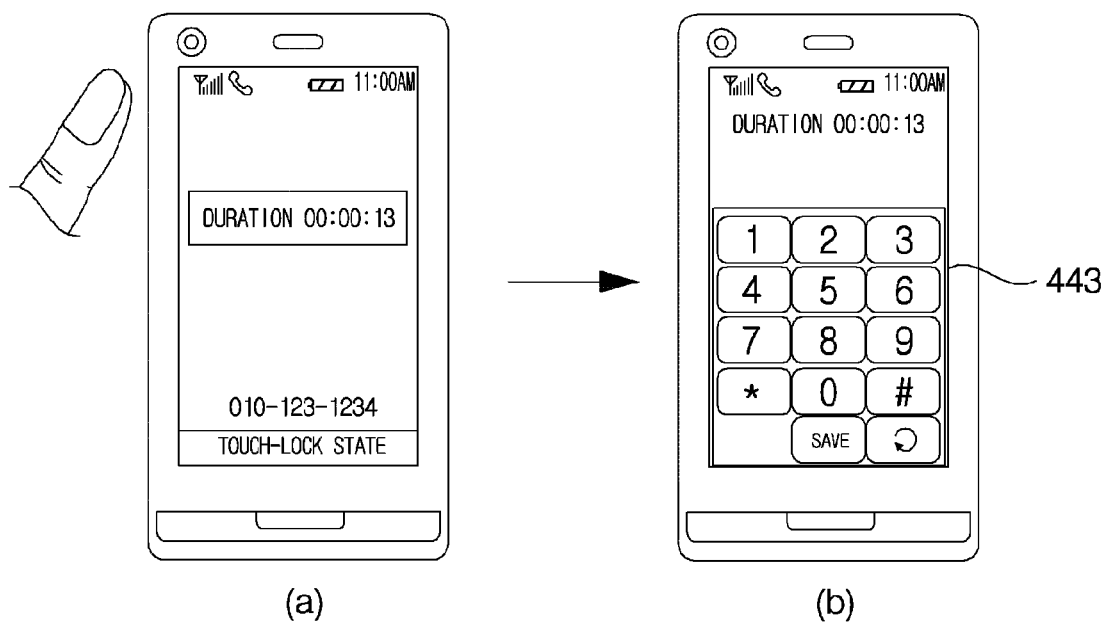

FIG. 40 illustrates diagrams for explaining how to activate a keypad for a touch screen in response to the movement of the mobile terminal 100. Referring to FIG. 40(a), during a call operation, the touch screen of the mobile terminal 100 may be placed in a touch-lock mode. If the user taps the mobile terminal 100 during a call operation, the controller 180 may determine that a command to activate a keypad has been input. Thus, referring to FIG. 40(b), the controller 180 may display a virtual number keypad 443 on the touch screen of the mobile terminal 100, and may release the mobile terminal 100 from the touch-lock mode. Therefore, the user may be able to input a phone number to the mobile terminal 100 by using the virtual number keypad 443.

Figure 41:
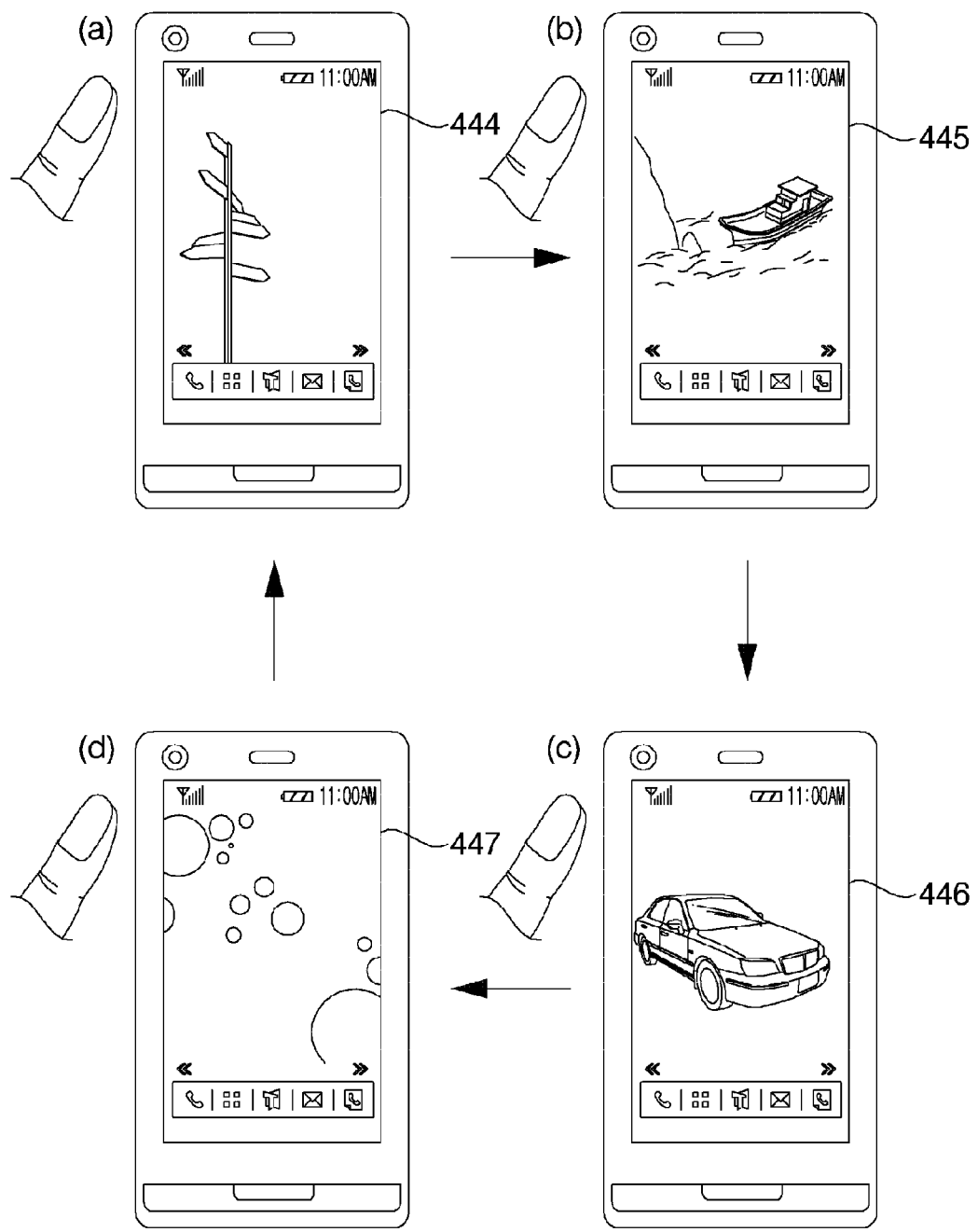

FIG. 41 illustrates diagrams for explaining how to change the background screen of the mobile terminal 100 in response to the movement of the mobile terminal 100. Referring to FIG. 41(a), if the user taps the mobile terminal 100 during an idle mode, the controller 180 may determine that a command to change the background screen of the mobile terminal 100 has been input. Thus, referring to FIG. 41(b), the controller 180 may change idle screen 444 from FIG. 41(a) to idle screen 445. The controller 180 may change the background screen of the mobile terminal 100 whenever the user taps the mobile terminal 100, as shown in FIGS. 41(c) and 41(d). In FIGS. 41(c) and 41(d), idle screen displayed on the mobile terminal 100 change from idle screen 446 to idle screen 447.

Figure 42:
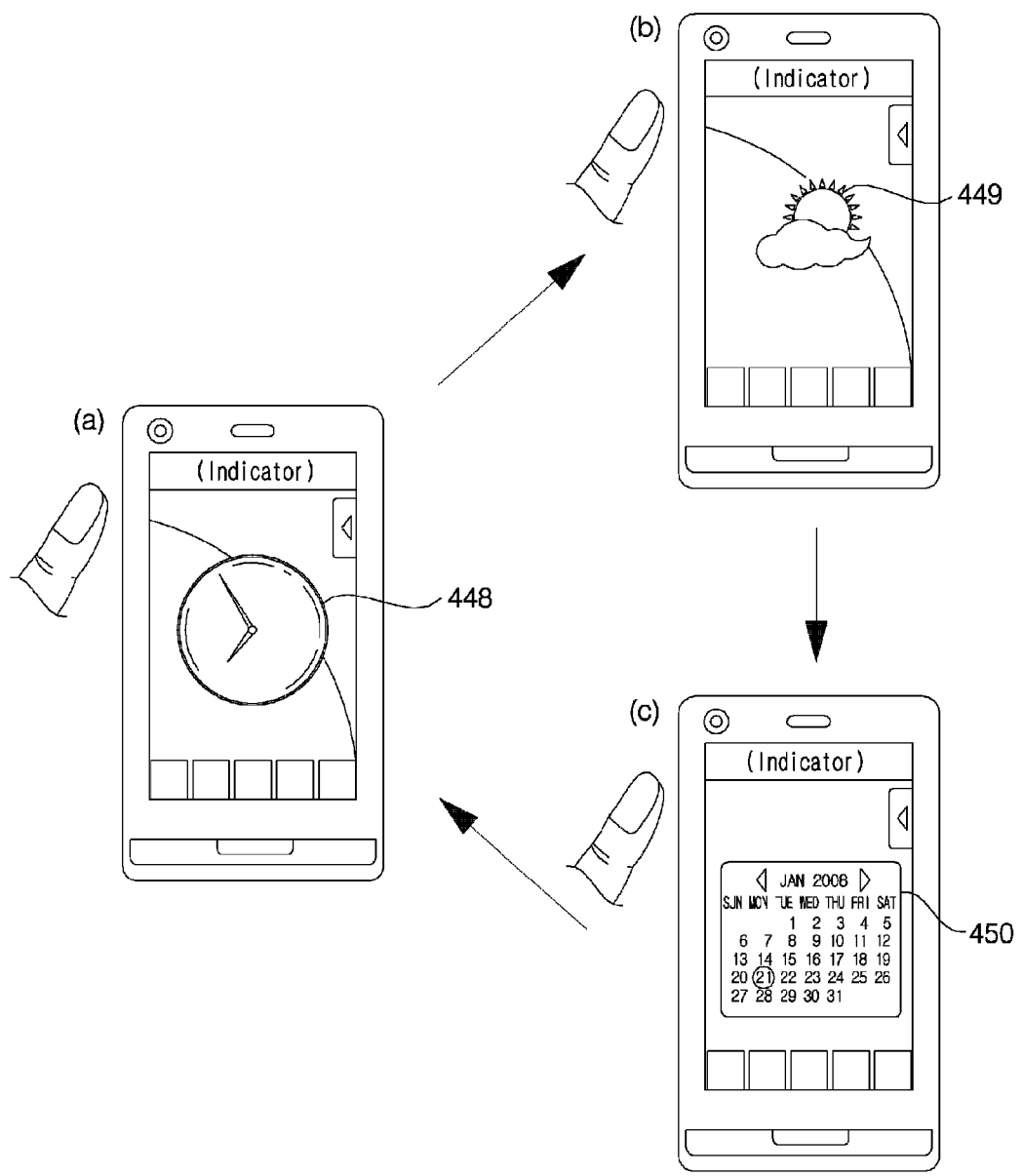

FIG. 42 illustrates diagrams for explaining how to switch the mobile terminal 100 between various widgets in response to the movement of the mobile terminal 100. If the user taps the mobile terminal 100 when the mobile terminal 100 is placed in an idle mode and a clock widget 448 is displayed in the display region of the mobile terminal 100, as shown in FIG. 42(a), the controller 180 may determine that a command to replace the clock widget 448 with a another widget has been input, and may thus replace the clock widget with a weather widget 449, as shown in FIG. 42(b). Thereafter, if the user taps the mobile terminal 100 again, the controller 180 may determine that the command to replace the weather widget 449 with another widget has been input again, and may thus replace the weather widget with a calendar widget 450, as shown in FIG. 42(*c*).

Figure 43:
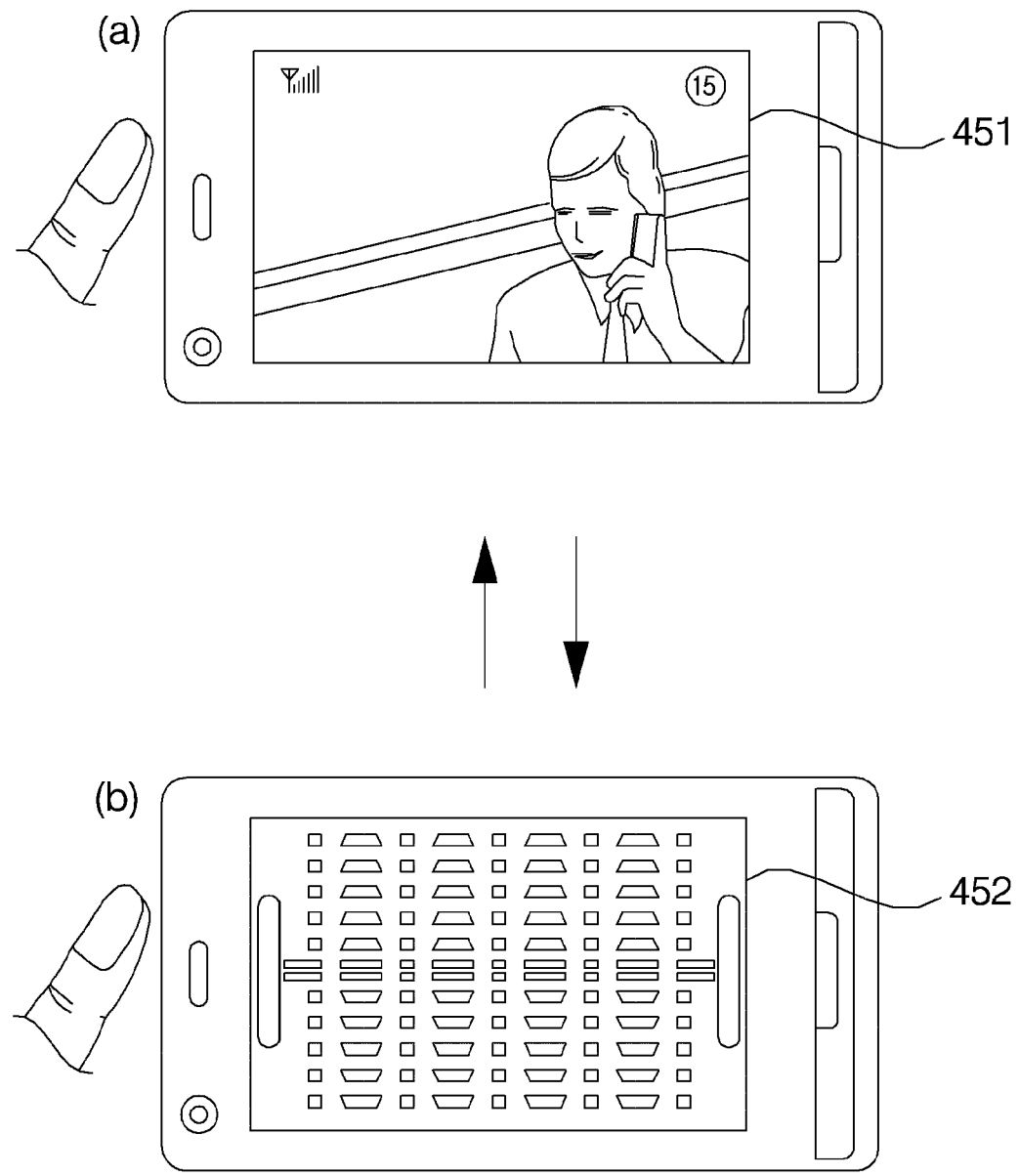
Figure 44:
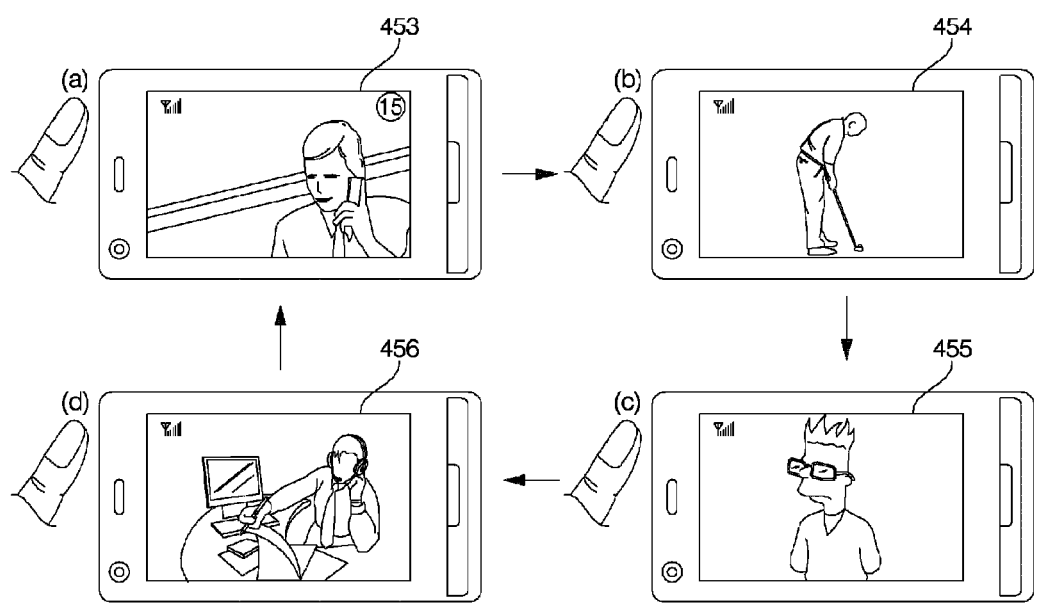

FIGS. 43 and 44 illustrate diagrams for explaining how to switch the mobile terminal 100 between various broadcast-receiving modes or between various broadcast channels in response to the movement of the mobile terminal 100. Referring to FIG. 43(*a*), if the user taps the mobile terminal 100 when the mobile terminal 100 is placed in a TV or DMB mode displaying the corresponding broadcast screen 451, the controller 180 may determine that a command to switch to a radio mode has been input. Thus, referring to FIG. 43(*b*), the controller 180 may switch the mobile terminal 100 to the radio mode and may display screen 452 corresponding to the radio mode in the display region of the mobile terminal 100, as shown in FIG. 43(*b*). Thereafter, if the user taps the mobile terminal 100 again, the controller 180 may determine that a command to switch to the TV or DMB mode has been input, and may thus switch the mobile terminal 100 back to the TV or DMB mode.

Alternatively, referring to FIGS. 44(*a*) through 44(*d*), if the user taps the mobile terminal 100 when the mobile terminal 100 is placed in the TV or DMB mode, the controller 180 may determine that a command to switch channels has been input, and may thus switch the mobile terminal 100 between various channels. The screen 453 through 456 corresponds to the broadcast screen of the channels which are being switched according to the user's tap.

Figure 45:
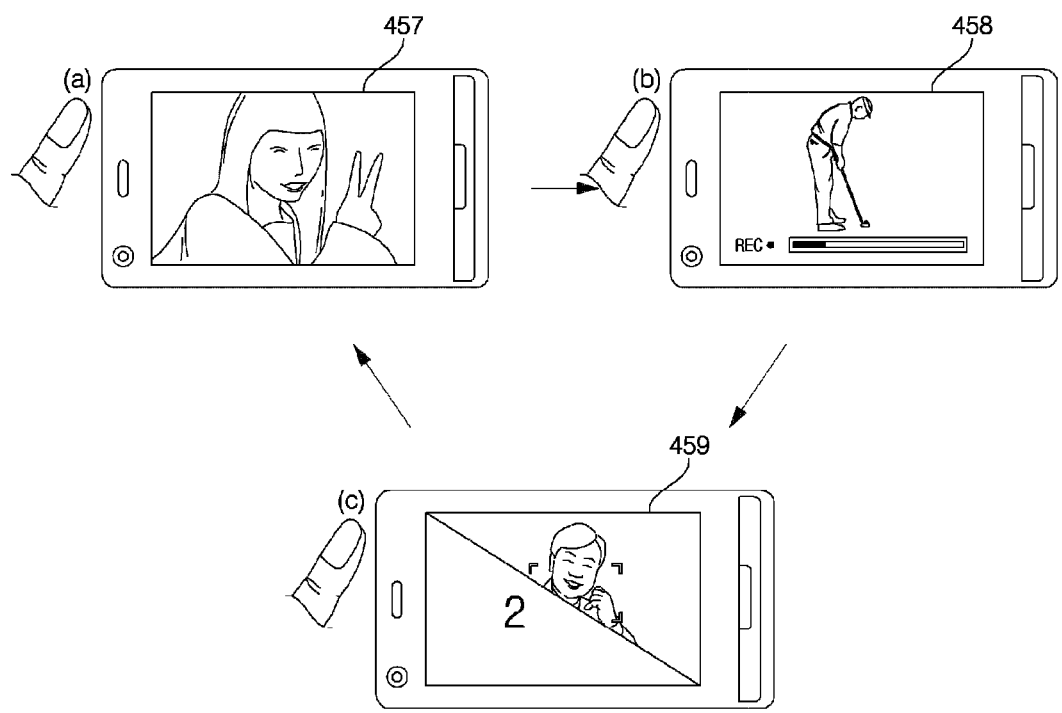

FIG. 45 illustrates diagrams for explaining how to change the image-capturing mode of the mobile terminal 100 in response to the movement of the mobile terminal 100. Referring to FIG. 45(*a*), if the user taps the mobile terminal 100 when the mobile terminal 100 is placed in a camera mode and screen 457 captured during the camera mode is displayed, in which an image sensor embedded in the mobile terminal 100 is used, the controller 180 may determine that a command to change the image-capturing mode of the mobile terminal 100 has been input. Thus, referring to FIG. 45(*b*), the controller 180 may switch the mobile terminal 100 from the camera mode to a video-camera mode and may display a moving image 458 currently being captured in the display region of the mobile terminal 100. Thereafter, referring to FIG. 45(*c*), if the user taps the mobile terminal 100 again, the controller 180 may determine that the command to change the image-capturing mode of the mobile terminal 100 has been input again, and may switch the mobile terminal 100 from the video-camera mode to a special-photographing mode, and may display a screen 459 corresponding to the special-photographing mode in the display region of the mobile terminal 100.

Figure 46:
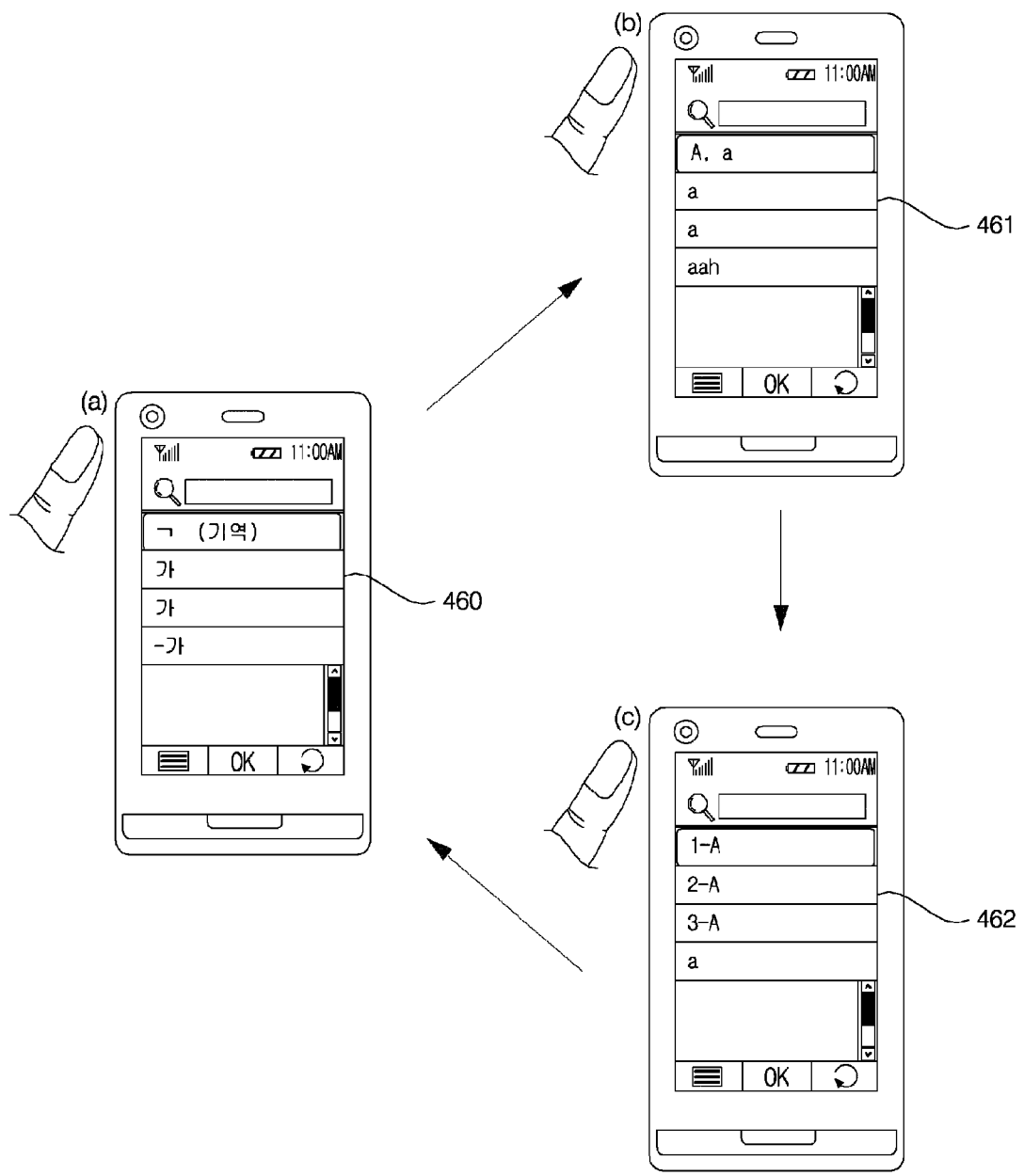

FIG. 46 illustrates diagrams for explaining how to switch the mobile terminal 100 between various dictionary modes in response to the movement of the mobile terminal 100. Referring to FIG. 46(*a*), if the user taps the mobile terminal 100 when the mobile terminal 100 is placed in an electronic-dictionary mode and a Korean-English dictionary screen 460 is displayed in the display region of the mobile terminal 100, the controller 180 may determine that a command to display another dictionary screen has been input. Thus, referring to FIG. 46(*b*), the controller 180 may display an English-Korean dictionary screen 461 in the display region of the mobile terminal 100. Thereafter, if the user taps the mobile terminal 100 again, the controller 180 may determine that the command to display another dictionary screen has been input again. Thus, referring to FIG. 46(*c*), the controller 180 may display an English-English dictionary screen 462 in the display region of the mobile terminal 100.

Figure 47:
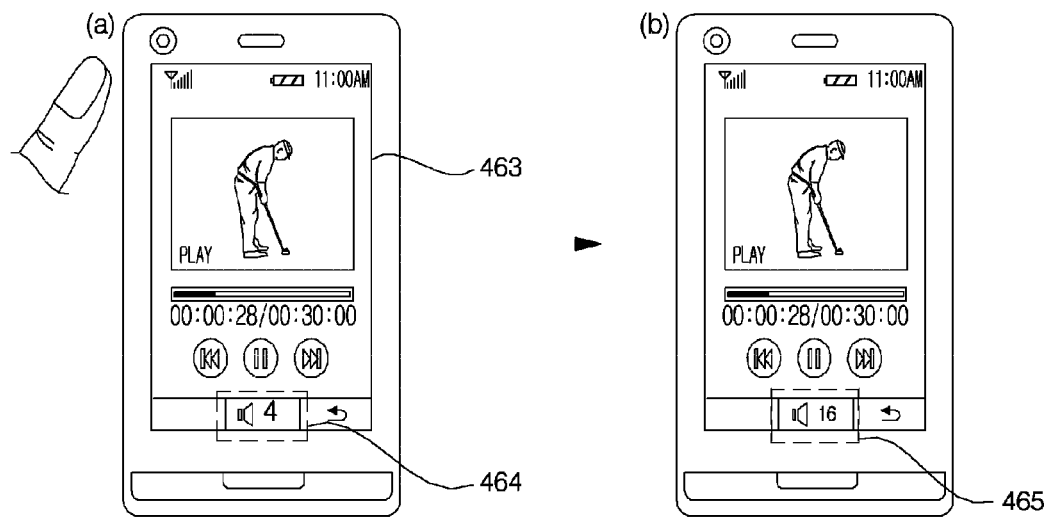

FIG. 47 illustrates diagrams for explaining how to adjust sound volume in response to the movement of the mobile terminal 100 when a multimedia play program is loaded and executed in the mobile terminal 100. Referring to FIG. 47(*a*), if the user taps the mobile terminal 100 when a multimedia program screen 463 corresponding to a certain multimedia program is being played by the mobile terminal 100, the controller 180 may determine that a command to adjust sound volume has been input. Thus, referring to FIG. 47(*b*), the controller 180 may change the sound volume of the multimedia program from level 4 to level 16. Then, the sound volume of the multimedia program may be easily identified from volume level windows 464 and 465.

Figure 48:
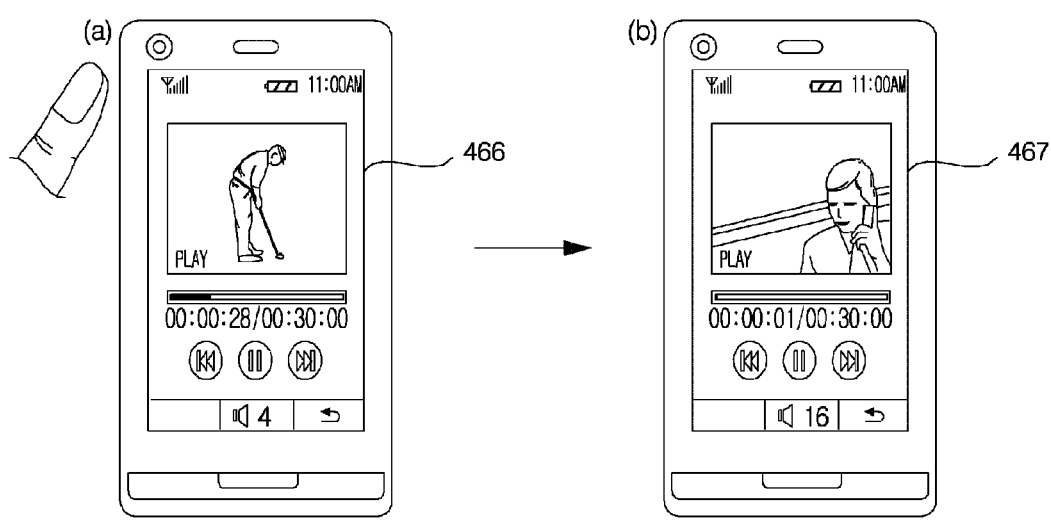

FIG. 48 illustrates diagrams for explaining how to switch the mobile terminal 100 between various multimedia contents in response to the movement of the mobile terminal 100. Referring to FIG. 48(*a*), if the user taps the mobile terminal 100 when a multimedia content 466 is being played by the mobile terminal 100, the controller 180 may determine that a command to play another multimedia content has been input. Thus, referring to FIG. 48(*b*), the controller 180 may play another multimedia content 467 in the display region of the mobile terminal 100.

Figure 49:
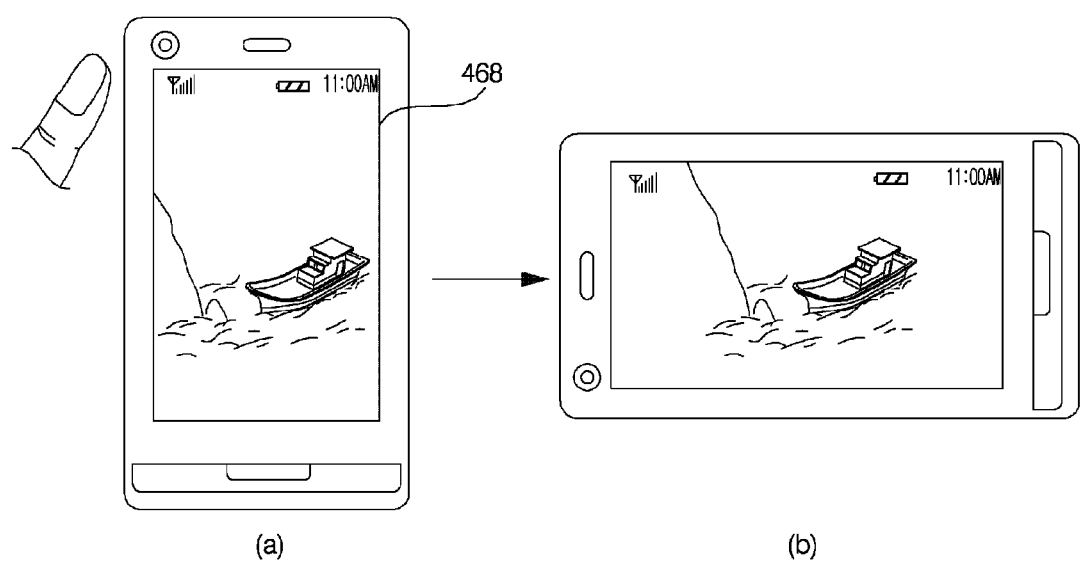

FIG. 49 illustrates diagrams for explaining how to rotate an image displayed in the mobile terminal 100 in response to the movement of the mobile terminal 100 when the mobile terminal 100 is placed in an image-file-view mode. Referring to FIG. 49(*a*), if the user taps the mobile terminal 100 when image 468 is displayed in the display region of the mobile terminal 100, the controller 180 may determine that a command to rotate the image has been input. Thus, referring to FIG. 49(*b*), the controller 180 may rotate the image 468.

According to another exemplary embodiment of the present invention, the controller 180 may switch the mobile terminal 100 between various incoming-call-alert modes (such as a ringtone mode, a vibration mode and a mute mode) in response to the movement of the mobile terminal 100. According to still another exemplary embodiment of the present invention, the controller 180 may switch the mobile terminal 100 between a number of participants in a conference call or a multi-party chat in response to the movement of the mobile terminal 100.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to provide a mobile terminal capable of selecting one of a plurality of text-input areas included in a webpage.

Therefore, it is possible for a user to selectively enlarge and display with ease each of a plurality of text-input areas included in a webpage without scrolling through the webpage. In addition, it is possible to sequentially enlarge and display or sequentially highlight a plurality of text-input areas included in a webpage in response to the movement of a mobile terminal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal configured for providing a web browsing function, the method comprising:
    displaying a webpage in a display region of a display unit of the mobile terminal, the webpage including at least two text-input areas configured for receiving text input;
    receiving a tab/cursor move command via an input unit of the mobile terminal, the input unit comprising at least a gyro-sensor, wherein receiving the tab/cursor move command input comprises:
        detecting a movement of the mobile terminal via the gyro-sensor; and
        generating a gyro signal in response to the detected movement; and
    extracting movement information from the generated gyro signal, via a controller of the mobile terminal, the extracted movement information comprising at least a moving direction of the mobile terminal, a moving speed of the mobile terminal, a number of times the movement is detected, or a pattern of the movement;
    controlling the display unit, via the controller, to move either the webpage or a web browser in which the webpage is displayed to position a text input area of the at least two text-input areas in a first designated area of the display region, or to enlarge or highlight a text input area of the at least two text-input areas based on the received tab/cursor move input,
    wherein moving either the webpage or the web browser comprises controlling the display unit, via the controller, to sequentially display the at least two text-input areas in the first designated area of the display region based on the extracted movement information, and
    wherein enlarging or highlighting the text input area of the at least two text-input areas comprises controlling the display unit, via the controller, to sequentially enlarge or highlight the at least two text-input areas based on the extracted movement information.

2. The method of claim 1, wherein the text-input area of the at least two text-input areas comprises a search window, an identifier (ID)/password input window, a text-input window for a bulletin board, or an address window configured for receiving a webpage address.

3. The method of claim 1, wherein the input unit further comprises one of a hard key, a joystick, a jog wheel, or a trackball and a soft key displayed in the display region.

4. The method of claim 1, wherein the display unit comprises a touch screen, the method further comprising:
    controlling the touch screen, via the controller, to display at least keyboard, a keypad, or a handwriting-input window.

5. The method of claim 4, further comprising:
    displaying the at least the keyboard, keypad or handwriting-input window such that it is positioned at a second designated area of the display region and does not overlap the first designated area.

6. The method of claim 1, further comprising controlling the display unit, via the controller, to enlarge the text-input area of the at least two text-input areas or a portion of the webpage or web browser including the text-input area of the at least two text-input areas based on a size of the display region.

7. The method of claim 1, further comprising setting, via the controller, an order in which to sequentially display the at least two text-input areas in the first designated area of the display region or an order in which to sequentially enlarge or highlight the at least two text-input areas in the first designated area.

8. The method of claim 1, further comprising:
    controlling the display unit, via the controller, to display text in the displayed text-input area of the sequentially displayed at least two text-input areas after moving the webpage or the web browser or to display text in the text-input area of the enlarged or highlighted text-input area of the sequentially enlarged or highlighted at least two text-input areas.

9. A mobile terminal configured for providing a web browsing function, the mobile terminal comprising:
    a display unit comprising a display region configured for displaying a webpage, the webpage including at least two text-input areas configured for receiving text input;
    an input unit configured for receiving a tab/cursor move command, the input unit comprising at least a gyro-sensor configured for detecting movement of the mobile terminal and generating a gyro signal in response to the detected movement; and
    a controller configured for:
        extracting movement information from the generated gyro signal, the extracted movement information comprising at least a moving direction of the mobile terminal, a moving speed of the mobile terminal, a number of times the movement is detected, or a pattern of the movement; and
        controlling the display unit to move either the webpage or a web browser in which the webpage is displayed to position a text input area of the at least two text-input areas in a first designated area of the display region, or to enlarge or highlight a text input area of the at least two text-input areas based on the received tab/cursor move input,
    wherein the controller is further configured for moving either the webpage or the web browser by controlling the display unit to sequentially display the at least two text-input areas in the first designated area of the display region based on the extracted movement information, and
    wherein the controller is further configured for enlarging or highlighting the text input area of the at least two text-input areas by controlling the display unit to sequentially enlarge or highlight the at least two text-input areas based on the extracted movement information.

10. The mobile terminal of claim 9, wherein the text-input area of the at least two text-input areas comprises a search window, an ID/password input window, a text-input window for a bulletin board, or an address window configured for receiving a webpage address.

11. The mobile terminal of claim 9, wherein the input unit further comprises one of a hard key, a joystick, a jog wheel, or a trackball and a soft key displayed in the display region.

12. The mobile terminal of claim 9, wherein: the display unit comprises a touch screen; and the controller is further configured for controlling the touch screen to display at least a keyboard, a keypad or a handwriting-input window.

13. The mobile terminal of claim 12, wherein the controller is further configured for controlling the touch screen to display at least the keyboard, keypad or handwriting-input window such that it is positioned at a second designated area of the display region and does not overlap the first designated area.

14. The mobile terminal of claim 9, wherein the controller is further configured for controlling the display unit to enlarge the text-input area of the at least two text-input areas or a portion of the webpage or web browser including the text-input area of the at least two text-input areas based on a size of the display region.

15. The mobile terminal of claim 9, wherein the controller is further configured for setting an order in which to sequentially display the at least two text-input areas in the first designated area of the display region or an order in which to sequentially enlarge or highlight the at least two text-input areas in the first designated area.

16. The mobile terminal of claim 9, wherein the controller is further configured for controlling the display unit to display text in displayed text-input area of the sequentially displayed two text-input areas after moving the webpage or to display text in the text-input area of the enlarged or highlighted text-input area of the sequentially enlarged or highlighted at least two text-input areas.

* * * * *